United States Patent [19]

Ganoung

[11] Patent Number: 4,964,318
[45] Date of Patent: * Oct. 23, 1990

[54] ENGINE CONTROL APPARATUS FOR IMPROVED FUEL ECONOMY

[76] Inventor: David P. Ganoung, 2800 ½ Candelaria, NW., Albuquerque, N. Mex. 87017

[ * ] Notice: The portion of the term of this patent subsequent to Oct. 4, 2005 has been disclaimed.

[21] Appl. No.: 145,568

[22] Filed: Jan. 19, 1988

Related U.S. Application Data

[63] Continuation-in-part of Ser. No. 06/859,431, May 5, 1986, Pat. No. 4,774,858, which is a continuation-in-part of Ser. No. 06/771,660, Sep. 3, 1985, abandoned, which is a continuation-in-part of Ser. No. 06/689,185, Jan. 7, 1985, which is a continuation-in-part of Ser. No. 06/451,613, Dec. 20, 1982, Pat. No. 4,505,169, which is a continuation-in-part of Ser. No. 6/205,625, Nov. 10, 1980, Pat. No. 4,383,456, which is a continuation-in-part of Ser. No. 6/020,916, Mar. 14, 1979, Pat. No. 4,280,469, which is a continuation-in-part of Ser. No. 05/767,060, Feb. 7, 1977, abandoned, which is a continuation-in-part of Ser. No. 05/616,640, Sep. 25, 1975, Pat. No. 4,023,641.

[51] Int. Cl.$^5$ .............................................. B60K 41/18
[52] U.S. Cl. .................................... 74/859; 74/860; 123/478; 123/480
[58] Field of Search .................. 74/857, 859, 860, 866, 74/877, 872, 856; 123/478, 480

[56] References Cited

U.S. PATENT DOCUMENTS

| | | | |
|---|---|---|---|
| 4,148,230 | 4/1979 | Kodoma et al. | 74/859 |
| 4,280,469 | 7/1981 | Ganoung | 123/568 |
| 4,342,298 | 8/1982 | Ganoung | 74/877 X |
| 4,353,272 | 10/1982 | Schneider et al. | 74/857 X |
| 4,383,456 | 5/1983 | Ganoung | 74/866 |
| 4,470,390 | 9/1984 | Omari et al. | 123/480 X |
| 4,473,052 | 9/1984 | Kamiyama et al. | 123/480 X |
| 4,492,203 | 1/1985 | Yutaka | 123/478 |
| 4,505,169 | 3/1985 | Ganoung | 74/866 X |
| 4,546,673 | 10/1985 | Shigematsu | 74/866 |
| 4,566,417 | 1/1986 | Suzuki et al. | 123/478 |
| 4,774,858 | 10/1988 | Ganoung | 74/859 |

Primary Examiner—Dirk Wright

[57] ABSTRACT

Engine control apparatus for use in passenger cars and other applications includes a special calibration of the intake mixture preparation system. Although this calibration duplicates the optimum calibration for use with a continuously variable transmission (CVT), the apparatus instead includes, for reasons of practicality, a discrete-ratio powershift transmission. Also included is a feedback control system which dispenses with the conventional mechanical connection between accelerator pedal and engine throttle valve. This drive-by-wire control system operates the engine as closely as is practical to the optimum CVT engine operating schedule, a predominantly wide-open-throttle engine operating schedule. The overall combination of special engine calibration and drive-by-wire control with a discrete-ratio transmission can offer the majority of the fuel economy advantage available with a CVT.

29 Claims, 8 Drawing Sheets

ENGINE CONTROL APPARATUS FOR IMPROVED FUEL ECONOMY

This application is a continuation-in-part of Ser. No. 859,431, May 5, 1986, U.S. Pat. No. 4,774,858, which is a continuation-in-part of Ser. No. 771,660. Sept. 3, 1985, abandoned, which is a continuation-in-part of Ser. No. 689,185, Jan. 7, 1985, now allowed, which is a continuation-in-part of Ser. No. 451,613, Dec. 20, 1982, U.S. Pat. No. 4,505,169, which is a continuation-in-part of Ser. No. 205,625, Nov. 10, 1980, U.S. Pat. No. 4,383,456, which is a continuation-in-part of Ser. No. 20,916, Mar. 14, 1979, U.S. Pat. No. 4,280,469, which is a continuation-in-part of Ser. No. 767,060, Feb. 7, 1977, abandoned, which is a continuation-in-part of Ser. No. 616,640, Sept. 25, 1975, U.S. Pat. No. 4,023,641, said Ser. No. 205,625 is also a continuation-in-part of Ser. No. 170,017, July 18, 1980, U.S. Pat. No. 4,342,298.

BACKGROUND OF THE INVENTION

1. Field of the Invention

This invention relates to apparatus for controlling the operation of a combustion engine in response to an input command.

2. Description of the Prior Art

Automotive engineers have long recognized that a continuously variable transmission (CVT) can in theory be used to restrict a passenger car engine to a fixed operating schedule of throttle position versus crankshaft speed. The operating schedule has often been chosen to coincide with the line of minimum brake specific fuel consumption across the engine map of throttle position versus crankshaft speed.

Nevertheless, practical considerations have often received less emphasis. For instance, CVT's have yet to make a significant impact in passenger car use, not to mention large over-the-highway tractors. Moreover, a conventional transmission with a large number of closely-spaced gear ratios can have a more than offsetting advantage in ratio range in comparison to a CVT. More importantly, the prior art has failed to recognize the synergism between drive-by-wire control and the approximation of a CVT engine operating schedule using a discrete-ratio transmission. For example, in U.S. Pat. No. 4,353,272 Schneider et al disclose a drive-by-wire control system adaptable to both CV and discrete-ratio transmissions, but evidently without realizing that synergism exists only for the case of discrete-ratio transmissions. Equally important is the failure of the prior art to recognize that the same special engine calibration is optimum for both CV and discrete-ratio transmissions.

SUMMARY OF THE INVENTION

In view of the above, it is therefore an object of the present invention to provide apparatus for optimizing the operation of an Otto cycle engine as used in conjunction with a discrete-ratio transmission.

It is also an object of the invention to present apparatus for approximating the optimized operation of an Otto engine that is possible using a continuously variable transmission.

It is another object of the invention to present apparatus for improving the fuel economy of Otto engines which power passenger cars.

These and other objects, features and advantages will become apparent to those skilled in the art from the following detailed description when read in conjunction with the appended claims and the accompanying drawing.

In accordance with the present invention in its broad aspect, apparatus for improving the fuel economy of an Otto cycle engine is presented. The apparatus includes components which are instrumental in preparing the intake mixture consumed by the engine. Over a broad crankshaft speed range, these components provide a high level of intake charge dilution when the engine throttle is wide open or effectively wide open. The apparatus also includes a feedback throttle control system and a discrete-ratio gearbox through which the Otto engine delivers its power output. The feedback control system is of the type which can approximate an engine operating schedule with no shift schedule hysteresis beyond that necessitated by the gaps between the various gear ratios in the gearbox.

BRIEF DESCRIPTION OF THE DRAWING

The present invention is illustrated in the accompanying drawing, in which.

In the figures of the drawing, like reference numerals denote like parts.

DESCRIPTION OF THE PREFERRED EMBODIMENTS

Figure 1:
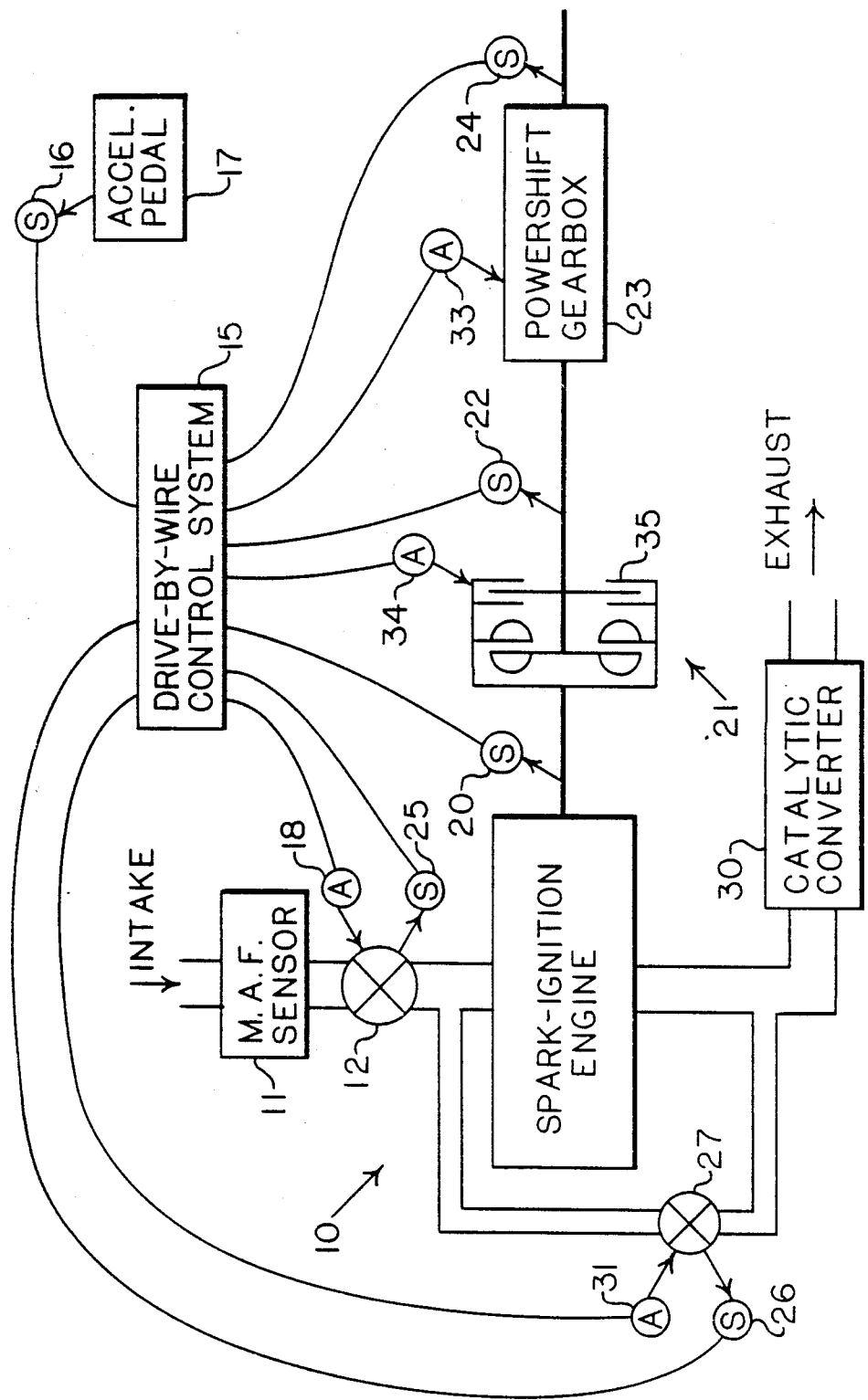
FIG. 1 is a diagram of the components in an automotive powertrain according to a preferred embodiment of the present invention.

FIG. 1 of the drawing shows how the main components would be arranged in a preferred embodiment of the present invention. In FIG. 1, a homogeneous-charge and naturally-aspirated passenger car engine, generally indicated by reference numeral 10, includes a few components which have special importance to the present invention and which therefore are explicitly shown and identified by separate reference numerals. For example, combustion intake air consumed by the engine 10 passes first through the mass air flow sensor 11 and then through the engine throttle valve 12 before entering the cylinders of the engine 10. Other components of the engine 1, such as individual fuel injectors for the intake port of each individual cylinder of the engine 10, are not shown explicitly in FIG. 1 because these components do not interact directly with the main components of the invention shown in FIG. 1. Nevertheless, the engine 10 does include a fully-sequential intake port fuel injection system of which the mass air flow sensor 11 is part, and the engine 10 also includes design features currently used in production passenger car engines to counteract the reduced expansion velocity component of cylinder flame speed arising from high rates of exhaust gas recirculation (EGR).

As shown, the control system 15 in FIG. 1 receives inputs from several sensors and in turn supplies outputs to several actuators. Exemplifying the sensors is the sensor 16 which delivers to the control system 15 an electrical signal indicating the position of the accelerator pedal 17 as selected by the driver of the associated passenger car. Like the sensor 16, all of the other sensors in FIG. 1 are denoted symbolically by the letter "S", for sensor, enclosed in a small circle. Similarly, the actuator 18 varies the position of the engine throttle valve 12 in response to a command signal from the control system 15, the actuator 18 being denoted symbolically by the letter "A" in a small circle. Since this actuator 18 can adjust the position of the engine throttle 12 independently of the driver's adjustment of the pedal 17, the control system 15 falls into a category known as drive-by-wire (DBW) control systems. The construction and operation of this DBW control system 15 will be considered in more detail with reference to other figures of the drawing.

Again in consideration of sensors with inputs to the control system 15, the sensor 20 supplies the control system 15 with a electrical RPM signal indicating the rotational speed with which the crankshaft of the engine 1 directly drives the power input of a fluid coupling assembly 21. A second RPM sensor 22 supplies the control system 15 with an electrical signal indicating the output shaft rotational speed of the coupling assembly 21. This RPM signal from the second sensor 22 also indicates the input shaft rotational speed of a 4-speed powershift gearbox 23 because the coupling assembly 21 directly drives the gearbox 23. The last RPM sensor 24 measures the power output shaft speed of the gearbox 23, which drives the traction wheels of the associated passenger car through any suitable final drive arrangement (not shown). The two remaining sensors 25 and 26 in FIG. 1 supply the control system 15 with electrical position signals. Specifically, the sensor 25 indicates the position of the engine throttle 12, and the sensor 26 indicates the position of the engine EGR valve 27.

As shown in FIG. 1, the EGR valve 27 does follow conventional practice by diverting exhaust back to intake from a point in the engine exhaust system upstream of the catalytic converter 30 to a point in the engine intake system downstream of the throttle valve 12. In contrast, the actuator 31 which controls the EGR valve 27 does no follow the conventional practice of relying on engine intake manifold vacuum as a power source. The actuator 31 may, however, borrow from what is conventional practice in the case of Diesel passenger car engines. That is, the EGR actuator 31 must use a source of constant vacuum for power, or alternatively, any other power source fully available at all times when the engine 10 is operating with its throttle 12 in the wide open position.

Last in FIG. 1 are the actuators 33 and 34. The gearbox shift actuator 33 enables the gear ratio in the gearbox 23 as selected by the control system 15 in a manner that will be considered later. Also in response to the control system 15, the other actuator 34 engages and releases a lock-up clutch 35 within the fluid coupling assembly 21. As a result, the coupling 21 acts as a solid connection when the lock-up clutch 35 is fully engaged, but purely as a fluid coupling when the clutch 35 is released.

Engine Dynamometer Testing

Figure 2:
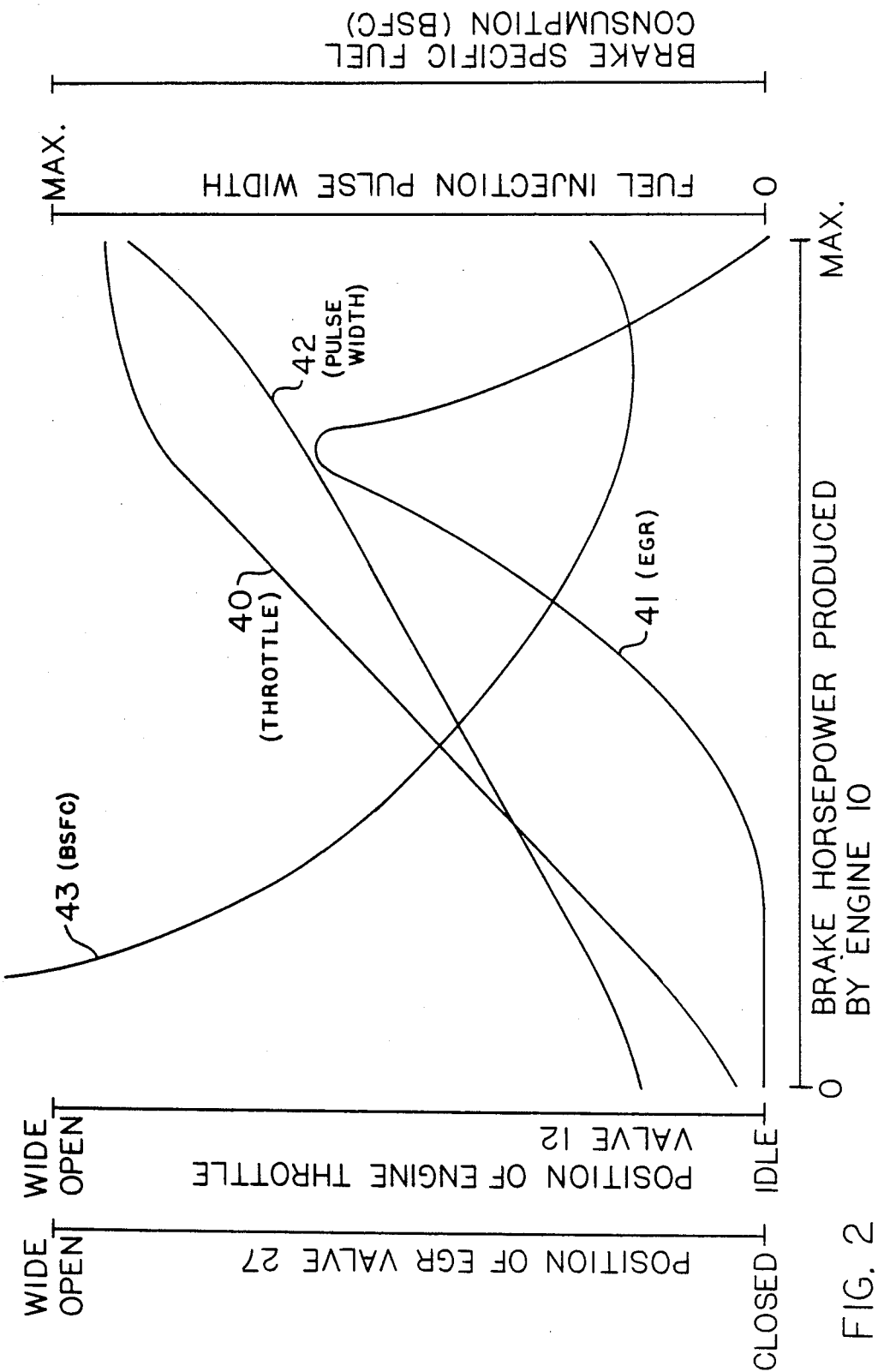
FIG. 2 represents stationary dynamometer data for the engine of FIG. 1.

In order that the control system 15 can be calibrated to establish optimum operating conditions for the engine 10, performance characteristics of the engine 10 must first be determined from stationary dynamometer testing of the engine 10 or an engine identical in design to the engine 10, including the design of the complete engine exhaust system to be used in the associated passenger car. FIG. 2 of the drawing reveals the nature of the dynamometer testing.

The entire process soon to be described for obtaining the various curves shown in FIG. 2 takes place at a fixed crankshaft speed of the engine 10. Moreover, the test results represented in FIG. 2 must be obtained for each in a progression of representative, fixed speeds of the engine 10. Throughout all of this testing, two procedures are always followed. First, the mass air flow sensor 11 is used in conjunction with the engine exhaust oxygen sensor (not explicitly shown in the drawing) to perform the normal "closed-loop" function of adjusting the time width of the fuel injection pulse for the engine 10 to thereby maintain the gasoline injected into the intake ports of the engine 10 in stoichiometric proportion to the air being consumed for combustion; this stoichiometric proportion is maintained even during operation with the engine throttle 12 wide open. Second, the ignition spark timing advance for the engine 10 is always maintained at the minimum value which produces best torque (commonly known as MBT spark timing) under the existing engine operating conditions. Following these two procedures, and holding crankshaft speed constant, the engine 10 will be capable of a range of power output. One such range of power serves as the horizontal axis seen in FIG. 2.

Against this horizontal axis of power available at a particular crankshaft speed of the engine 10, position of the engine throttle 12 is shown by the curve 40, position of the EGR valve 27 by the curve 41, time width of the fuel injector opening pulse for the engine 10 by the curve 42 and the resultant brake specific fuel consumption (BSFC) of the engine 10 by the curve 43. These curves 40, 41, 42 and 43 are obtained from dynamometer testing of the engine 10, or an identical engine, such that any particular BSFC given by the BSFC curve 43 is the minimum BSFC with which the engine 10 can deliver the corresponding value of brake power on the horizontal axis of FIG. 2 while also operating at the single crankshaft speed for which FIG. 2 is valid. In other words, the engine 10 could operate more efficiently only if the blanket procedure of always supplying a stoichiometric air-fuel charge were abandoned in favor of lean operation. The engine 10 uses recirculated exhaust gas as the intake charge dilutant instead of dilution with the excess air of lean combustion so that the 3-way catalytic converter 30 can reduce nitrogen oxides while at the same time oxidizing hydrocarbons and carbon monoxide.

The curves 40, 41, 42 and 43 in FIG. 2 are obtained in the following way. First, test operation of the engine 10 determines the approximate brake torque that results with the engine throttle 12 wide open and the EGR valve 27 completely closed. Still with the EGR valve 27 closed, the throttle 12 is next closed to reduce brake torque to roughly 30% of the wide-open-throttle value just measured; BSFC is measured at this dynamometer operating point of the engine 10. No with no change in injector pulse width, and consequently no change in fuel consumption rate, the EGR value 27 is opened by increments and BSFC measured at each of the resulting positions of the EGR valve 27. The constant pulse width of this last procedure usually requires that the engine throttle 12 be opened somewhat as the EGR valve 27 is opened because the increasing recirculation of exhaust gas tends to relieve the pressure drop across the engine throttle 12. At any rate, this trial-and-error procedure identifies the particular combination of positions of the throttle 12 and EGR valve 27 which minimize BSFC for the original pulse width and corresponding constant fuel flow rate. Only values determined from this minimum BSFC operating condition become data points on the curves 40, 41, 42 and 43 in FIG. 2, and these data points are of course located laterally in FIG. 2 by the brake power developed at the minimum BSFC condition for the original pulse width. Next the injection pulse width is increased by a small increment and the minimum BSFC condition determined for the new pulse width in exactly the same manner as just described for the original pulse width. This will obviously produce another data point on each of the curves 40, 41, 42 and 43 at a lateral position somewhat to the right in FIG. 2 of the data points first located. In this way, the engine data curves 40, 41, 42 and 43 are extended to the right in FIG. 2 until the engine throttle 12 first reaches its wide open position, or an effectively wide open position beyond which very little increase in mass air flow through the sensor 11 occurs.

As seen in FIG. 2, the throttle position curve 40 does not reach its wide open position, nor does the curve 40 reach its idle position when engine power is zero. As just suggested, the maximum throttle opening attained by the curve 40 is an effectively wide open position beyond which very little extra air flow results. This condition of essentially maximum air flow at distinctly less than the actually wide open position of the throttle 12 occurs only for low to medium crankshaft speeds of the engine 10. The curve 40 could nevertheless continue to its wide open position, but the curve 40 levels off to thereby enhance the response of the DBW control system 15. The curve 40 does not reach its idle position at zero engine power output simply because the idle position produces zero power output only at engine idle speed, while FIG. 2 represents a low to medium engine speed.

The process already decribed for determining the curves 40, 41, 42 and 43 requires that increasing opening of the engine throttle 12 be accompanied by increase in the mass percentage accounted for by EGR in the intake mixture consumed by the engine 10. The consequent need for high EGR flow when the pressure drop across the EGR valve 27 is being relieved by large opening of the engine throttle 12 means that the EGR valve 27 and its connecting flow passageways in the engine 10 must have the large proportions more normal for a Diesel engine than for the gasoline engine 10. Even so, two factors mitigate any need for the engine 10 to employ the exhaust backpressure regulation that is sometimes used as part of the EGR control system on Diesel passenger car engines. First, the catalytic converter 30 causes exhaust backpressure generally well in excess of unregulated backpressure in Diesel engines. And second, Diesel engines often require substantial EGR flow when unthrottled engine operation is combined with the low backpressure of low brake torque output. This combination never exists for the engine 10, but the engine 10 does require that cylinder-to-cylinder and cycle-to-cycle distribution of recirculated exhaust gas be very consistent.

Considering now the extreme righthand portion of FIG. 2 where an effectively wide open position of the engine throttle 12 is maintained by only slight increase in the opening of the throttle 12, further increases in brake torque are achieved by progressively closing the EGR valve 27. Consequently, the extreme righthand portions of the curves 40, 41, 42 and 43 are determined without resorting to the trial-and-error procedure used when the fuel flow rate to the engine 10 can be held constant in spite of adjustment of the EGR valve 27. Another feature of the righthand portion of FIG. 2 is that the minimum BSFC value along the entire BSFC curve 43 accompanies an effectively wide open position of the engine throttle 12 in combination with a reduced opening of the EGR valve 27. This is true regardless of whether the constant engine speed being investigated is high or low.

The extreme lefthand portions of the curves 40, 41, 42 and 43 are completed by incrementally decreasing injection pulse width from its original value and continuing to apply at each increment the trial-and-error process already explained for determining minimum BSFC at a constant fuel consumption rate and constant engine speed. FIG. 2 confirms that the trial-and-error process is also unnecessary at the very low brake torque levels where EGR acts only to increase BSFC.

As noted earlier, the entire testing procedure represented by FIG. 2 is to be repeated throughout a progression of representative crankshaft speeds of the engine 10 extending from idle RPM to the RPM at which maximum brake power is developed by the engine 10. Thus, each of the curves 40, 41, 42 and 43 is only the intersection of one of the resulting three-dimensional data surfaces (for throttle position, EGR valve position, fuel injection pulse width and BSFC) with a plane surface located at the constant engine speed used to generate the curves 40, 41, 42 and 43. More importantly, the whole purpose of stationary dynamometer testing of the engine 10 is to obtain these four surfaces of data located above the plane of brake power produced by the engine 10 versus crankshaft speed of the engine 10. In addition, the corresponding data surface for MBT spark timing of the engine 10 is needed, but not used directly by the drive-by-wire control system 15.

When the "subprocedure" represented by FIG. 2 is employed at crankshaft speeds of the engine 10 near its idle speed, considerations of NVH (noise, vibration and harshness) of the associated passenger car will almost certainly outweigh the importance of BSFC. Taking a slightly different viewpoint, the BSFC curve 43 is in reality the curve of the cost in fuel for each brake-horsepower-hour of mechanical energy delivered by the engine 10. The three-dimensional brake specific fuel cost function which encompasses the fuel cost curve 43 can be extended, via estimated weighting factors, to include other operational costs such as of NVH and engine exhaust emissions. In fact, all of the dynamometer testing of the engine 10 should include brake specific measurements of all relevant chemical species of exhaust emissions in order that the three-dimensional brake specific cost function exemplified by curve 43 can be extended, if necessary, to include exhaust emissions.

Before leaving the subject of NVH, it should be noted that high fuel efficiency characterizes operation of the engine 10 with its throttle 12 effectively wide open. On the other hand, power output with the throttle 12 effectively wide open can be taken only so low before encountering a limit determined by NVH considerations. While appropriate design of the powertrain components in FIG. 1 and of the associated passenger car can reduce this lower limit, the limit is inherently lower than might immediately be obvious. In the first place, the high EGR rate corresponding to the peak value of the curve 41 will usually reduce wide-open-throttle torque of the engine 10 by at least 30% in comparison to wide-open-throttle operation at the same RPM using a conventional engine calibration (no EGR and enrichment well past stoichiometric). Thus, power is reduced by an equal amount, but the reduction in torque itself allows a significant lowering of the minimum RPM acceptable with the throttle 12 effectively wide open. So EGR dilution of the intake charge consumed by the engine 10 lowers both the minimum torque and the minimum RPM produced with the throttle 12 effectively wide open, but produced without exceeding chosen NVH limits.

Regardless of the various weighting factors that could be included in the three-dimensional brake specific cost function for the engine 10, the preferred procedure is that the initial weighting factors be one for fuel consumption and zero for all other factors. NVH and engine durability problems can then be avoided simply by considering an appropriate area of low RPM, high brake torque operation of the engine 10 to be unattainable, just as crankshaft RPM above the maximum for the engine 10 will be considered unattainable. If, however, the initial weighting factors result in unacceptably high exhaust emission levels during chassis dynamometer testing of the associated passenger car, only then should additional non-zero weighting factors be considered. If weighting factors are added for exhaust emissions, they should be very modest at first because their effect is twofold. First, the particular combination of position of the throttle 12 and position of the EGR valve 27 occurring at a particular power level in FIG. 2 depends on how importance is apportioned by weighting factors among various considerations such as fuel consumption and exhaust emissions. For this reason, all initially "non-optimum" dynamometer test results for the engine 10 should be retained for possible further use. Moreover, the weighting factors have a second influence—on a procedure that will be explained with reference to FIG. 5. Another consideration is that a very significant improvement in a secondary engine performance parameter, such as emissions of nitrogen oxides, could possibly be secured with an almost insignificant sacrifice in the primary performance parameter, that of fuel efficiency. Only very modest weighting factors for the secondary parameters will accurately identify such a situation. In any case, the weighting factor for BSFC should overshadow all other weighting factors to the extent that the lowest part of the brake specific cost curves, of which the curve 43 is an example, will in general occur when the throttle 12 is at least effectively wide open. At low RPM of the engine 10, an NVH weighting factor can of course shift the lowest portion of the brake specific cost curve well away from effectively wide-open-throttle operation of the engine 10.

If a significant conflict arises between acceptable exhaust emission levels and minimum BSFC, then the emissions control hardware used on the engine 10 should be upgraded. For example, an added engine-driven air pump could be used to further reduce hydrocarbon and carbon monoxide emissions by injecting air into a second oxidation-only bed of the catalytic converter 30. As another example, heat insulation and a mounting location closer to the engine 10 will each increase the operating temperature of the catalytic converter 30. Moreover, the current automotive practice of retarding ignition spark timing to reduce exhaust emissions is to be used only as a last resort; the spark timing of the engine 10 is, however, retarded from MBT in response to an autoignition sensor mounted on the engine 10. (Retarded spark timing acts to reduce exhaust emissions in two ways, but at the expense of engine operating efficiency. First, reduced peak combustion temperature moderates the formation of nitrogen oxides; increased EGR dilution of the air-fuel charge will usually accomplish the same thing without nearly so much sacrifice in engine efficiency. Second, retarded spark timing increases the operating temperature of the catalytic converter 30, but, as just explained, there are better ways to do this.)

In final consideration of dynamometer testing of the engine 10, ignition spark timing is, as implied before, advanced to maintain MBT timing in spite of the decrease in burn rate which accompanies the trial-and-error procedure that locates minimum BSFC at constant fuel injection pulse width. This is not to say that MBT spark timing cannot be abandoned to control autoignition in very limited areas of the final calibration of the engine 10. As is widely appreciated, the alternative of a lower engine compression ratio sacrifices efficiency in all areas of engine operation, rather than in just the problem areas.

Dynamometer Testing of Some
Alternative Engine Types

As the first example of alternative engine types, sufficiently lenient standards for exhaust emissions would allow the engine 10 to use the excess air of lean combustion to replace recirculated exhaust gas as the dilutant for the intake charge consumed by the engine 10. In this case, the EGR valve 27 and its associated sensor 26 and actuator 31 would be eliminated entirely. Moreover, the previous trial-and-error procedure for obtaining minimum brake specific cost of operating the engine 10 at constant crankshaft RPM and at constant fuel injection pulse width would become more convenient. Dilution would be increased in search of minimum brake specific cost simply by further opening the engine throttle 12. All other aspects of stationary engine dynamometer testing would remain basically as already described for the engine 10, except of course, that there would be no EGR valve position curve like the curve 41 in FIG. 2. This lean-burn variation of the engine 10 offers somewhat improved fuel efficiency due to more complete in-cylinder combustion and due to the improvement in specific heat ratio brought about by dilution with air. On the other hand, the catalytic converter 30 could no longer reduce nitrogen oxides, and oxygen would be more available for the in-cylinder formation of nitrogen oxides.

Figure 3:
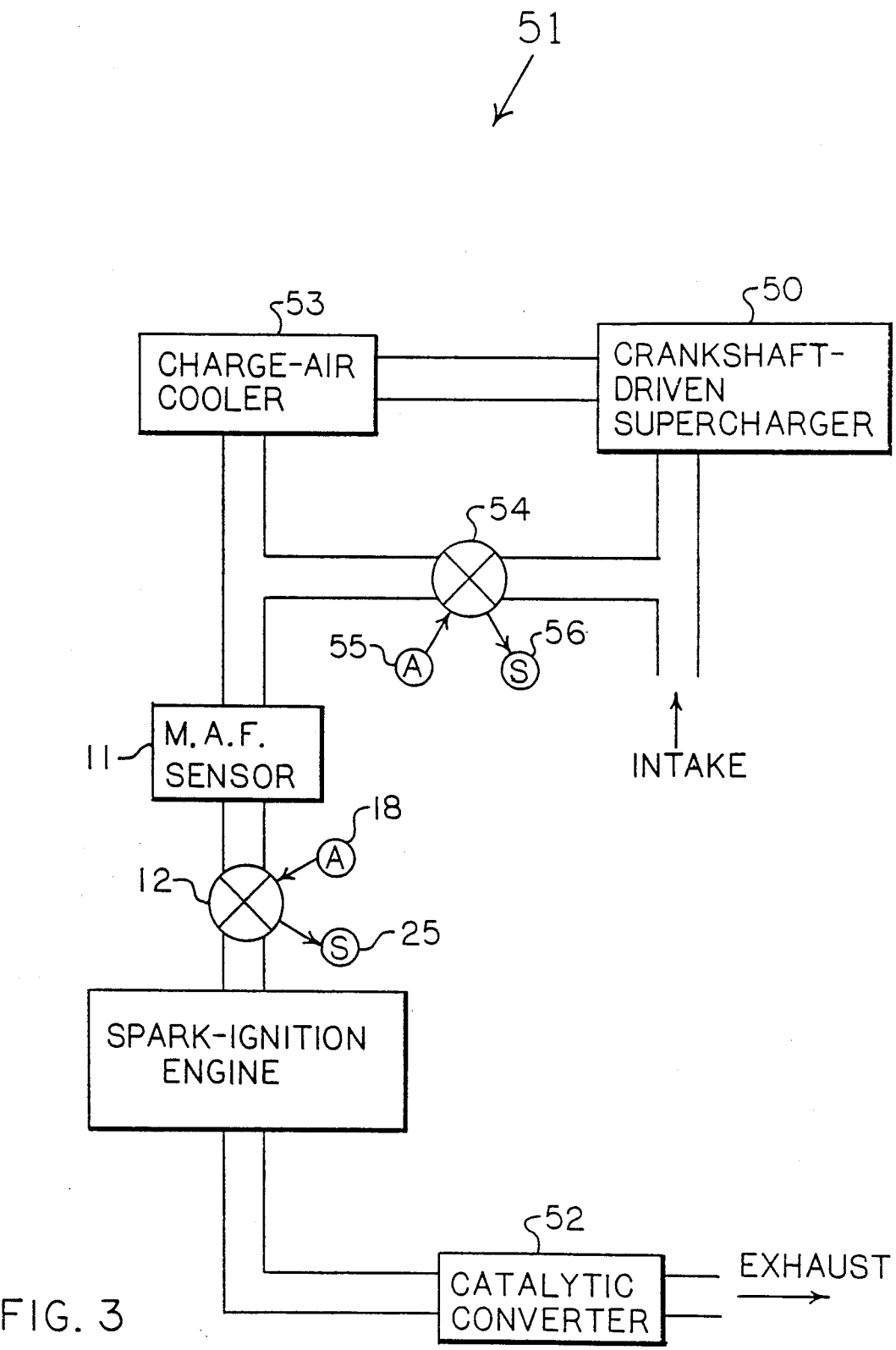
FIG. 3 is a diagram of a supercharged engine that may be used in place of the naturally-aspirated engine of FIG. 1.

The foregoing lean-burn variation of the engine 10 could be further modified to include the crankshaft-driven supercharger 50 shown in FIG. 3. The resulting alternative engine assembly 51 of FIG. 3 still inducts air through the same basic types of mass air flow (MAF) sensor 11 and engine throttle 12 that are shown in both of FIGS. 1 and 3. The optional catalytic converter 52, however, is not the 3-way type 30 shown in FIG. 1, but rather is designed to catalyze only oxidation. In addition, the MAF sensor 11 now operates under boost pressure because pressurized intake air from the supercharger 50 is delivered through the charge-air cooler 53 to the MAF sensor 11. Last in FIG. 3 is the supercharger by-pass valve 54 with its associated actuator 55 and position sensor 56. This by-pass valve 54 allows a variable amount of air cooled by the charge-air cooler 53 to return to the intake of the supercharger 50. That is to say, the by-pass valve 54 serves to regulate the pressure boost provided by the supercharger 50 in a way that reduces power consumed by the supercharger 50 when little or no boost pressure is needed. The air-to-air charge-air cooler 53 also contributes to reduction in the power consumed by the supercharger 50.

Unlike the naturally-aspirated engine 10, the supercharged engine 51 never operates at its highest levels of BMEP (brake mean effective pressure) without an accompanying high level of intake charge dilution. This feature allows the engine 51 to continuously utilize an unusual combination of high boost pressure and compression ratio near normal for a naturally-aspirated engine but without resorting to high-octane fuel. The charge-air cooler 53 also helps in this regard, but intake charge dilution is the more important factor.

Because of the accentuated need for intake charge dilution, the dynamometer test procedure for the supercharged engine 51 departs slightly in principle from that outlined earlier for a lean-burn variation of the naturally-aspirated engine 10. At each representative crankshaft speed of the engine 51, the BSFC for one particular fuel injection pulse width will be minimized just at the point when the by-pass valve 54 first becomes fully closed to provide full boost. (An effectively wide open position of the throttle 12 will always accompany the full boost position of the by-pass valve 54.) The RPM schedule of these particular values of pulse width is chosen as the schedule of maximum pulse width for the engine 51. From a slightly different viewpoint, the dynamometer testing of the engine 51 is basically as outlined earlier for the lean-burn variation of the engine 10, except that the highest BMEP range of the testing does not extend beyond the trial-and-error process also used for the great majority of the middle and lower BMEP range. (For the lean-burn variation of the naturally-aspirated engine 10, the highest BMEP range results from progressively reducing intake charge dilution in search of minimum BSFC, but the dilution is reduced simply by increasing fuel injection pulse width.)

In more detail, the by-pass valve 54 can close to apply boost pressure to the engine 51 more quickly if the valve 54 does not open beyond the smallest opening that relieves substantially all of the pressure rise occurring through the supercharger 50. This smallest effectively wide open position of the valve 54 will obviously increase as a function of the crankshaft speed of the engine 51, and the valve 54 is to follow this function whenever the engine throttle 12 is less than effectively wide open. Similarly, the throttle 12 follows its current minimum for being effectively wide open whenever the by-pass valve 54 is closed far enough to apply boost to the engine 51. So the by-pass valve 54 is effectively wide open at lower BMEP of the engine 51, and the throttle 12 is effectively wide open at higher BMEP. The corresponding data surfaces for positions of the throttle 12 and by-pass valve 54 are determined in the stationary dynamometer testing of the engine 51. As a result, extra intake charge dilution is added at higher BMEP of the engine 51 by further closing the by-pass valve 54, rather than by further opening the throttle 12, as is the case at lower BMEP. In either case, just enough dilution with the excess air of lean combustion is added to minimize BSFC for a given fuel injection pulse width. The results of this minimization are data surfaces of BSFC and pulse width located above the plane of crankshaft speed of the engine 51 versus brake power produced by the engine 51. The minimum BSFC at any fixed crankshaft speed of the engine 51 will always accompany full boost if the engine 51 is calibrated as just explained. (Full boost pressure is actually a pressure function of the crankshaft speed of the engine 51 because the engine 51 receives full boost pressure whenever the throttle valve 12 is effectively wide open and the by-pass valve 54 is at the same time fully closed. Moreover, other apparatus, such as that which determines the fixed drive speed ratio for the supercharger 50, also influences the maximum density of the engine intake air existing on the downstream side of the throttle valve 12. However, as will be explained later, the drive-by-wire control system 15 would use only the positions of the valves 12 and 54 in regulating intake air density to thereby control the torque output of the engine 51 in response to the desired amount of engine power output as being indicated by the position of the accelerator pedal 17. Thus the supercharger drive speed ratio for the engine 51 plays no direct role in determining whether the control system 15 is causing full boost pressure to be applied to the engine 51. Similarly, the boost pressure relief setting for the exhaust wastegate in a completely conventional turbocharger system does not regulate engine torque in response to a varying amount of power desired by the operator of the engine; full boost pressure as defined herein exists in such a conventional turbocharger system whenever the engine throttle valve is wide open, regardless of whether the turbocharger can under the existing conditions actually supply much boost in intake pressure.)

The BSFC of the engine 51 could be reduced to values less than the minima achieved using the overall dynamometer testing as just described. Nothing more is required than increasing injection pulse width at full boost until BSFC reaches its minimum, but at the same time, higher fuel octane would be necessary. (As always, MBT spark timing of the engine 51 must also be maintained.) As an alternative utilization of higher fuel octane, higher supercharger boost pressure can be used with exactly the same dynamometer test and calibration procedure already explained for the engine 51. This alternative is preferred because it is likely to yield a greater benefit in BSFC; it will also require design change, as in the drive ratio for the supercharger 50. (In effect, only the more undesirable of these two alternatives is available for naturally-aspirated engines like the engine 10.) After selecting this more desirable alternative, boost pressure can still be traded off against engine compression ratio, but only a quite ambitious dynamometer study would yield the optimum tradeoff. As a rough guide, charge-air desities 1½ to 2 times sea level density can usually be combined with compression ratios near those normal for a naturally-aspirated, spark-ignition engine operating on gasoline having an octane rating of about 90. As will become more evident, the engine 51 will operate under near-maximum boost pressure much more extensively than is usual for a conventional supercharged passenger car engine.

In operation, the engine 51 requires a fuel injection pulse width that is based on the mass air flow signal from the MAF sensor 11 and on another measured parameter, preferably the crankshaft speed of the engine 51. The necessary data relating fuel-air ratio to crankshaft speed and to the mass flow rate of combustion air is easily obtained by measuring mass air flow rate throughout the dynamometer test procedure for the engine 51. This fuel-air ratio data is stored in read-only-memory of the fuel injection system of the engine assembly 51, and the resulting control of injection pulse width will inherently help compensate for changes in atmospheric density of the combustion air inducted by the engine 51. An alternative approach does not require the MAF sensor 11, but neither does it inherently compensate for changes in operating altitude or for transient errors in the positions of the throttle 12 and the by-pass valve 54 relative to each other. For this alternative approach, injection pulse width is retrieved from the dynamometer data for the engine 51 using measured values for crankshaft speed and for position of the throttle 12. In this alternative case the corresponding read-only-memory data is stored not in what is normally thought of as the engine fuel injection system but rather in an engine data storage and control unit 90 that will be considered with reference to FIG. 6.

The supercharged engine 51 is preferred to the naturally-aspirated engine 10 for certain applications of the powertrain components of FIG. 1 which satisfy two conditions. The engine 51 must be able to meet the applicable standards for exhaust emissions with little compromise in fuel efficiency, and the cost penalty of the supercharger 50 must not be prohibitive. These conditions are much more common for trucks than for passenger cars, and more common still for other applications such as agricultural equipment. In fact, the engine 51 could operate on propane to be cost competitive with Diesel engines even without the benefit of the transmission shift scheduling that will be explained with reference to FIGS. 5 and 6. Aside from being an inexpensive fuel for spark-ignition engines, propane greatly reduces exhaust emissions of hydrocarbons and carbon monoxide during cold engine operation. This last advantage makes the oxidizing catalytic converter 52 less necessary.

Figure 4:
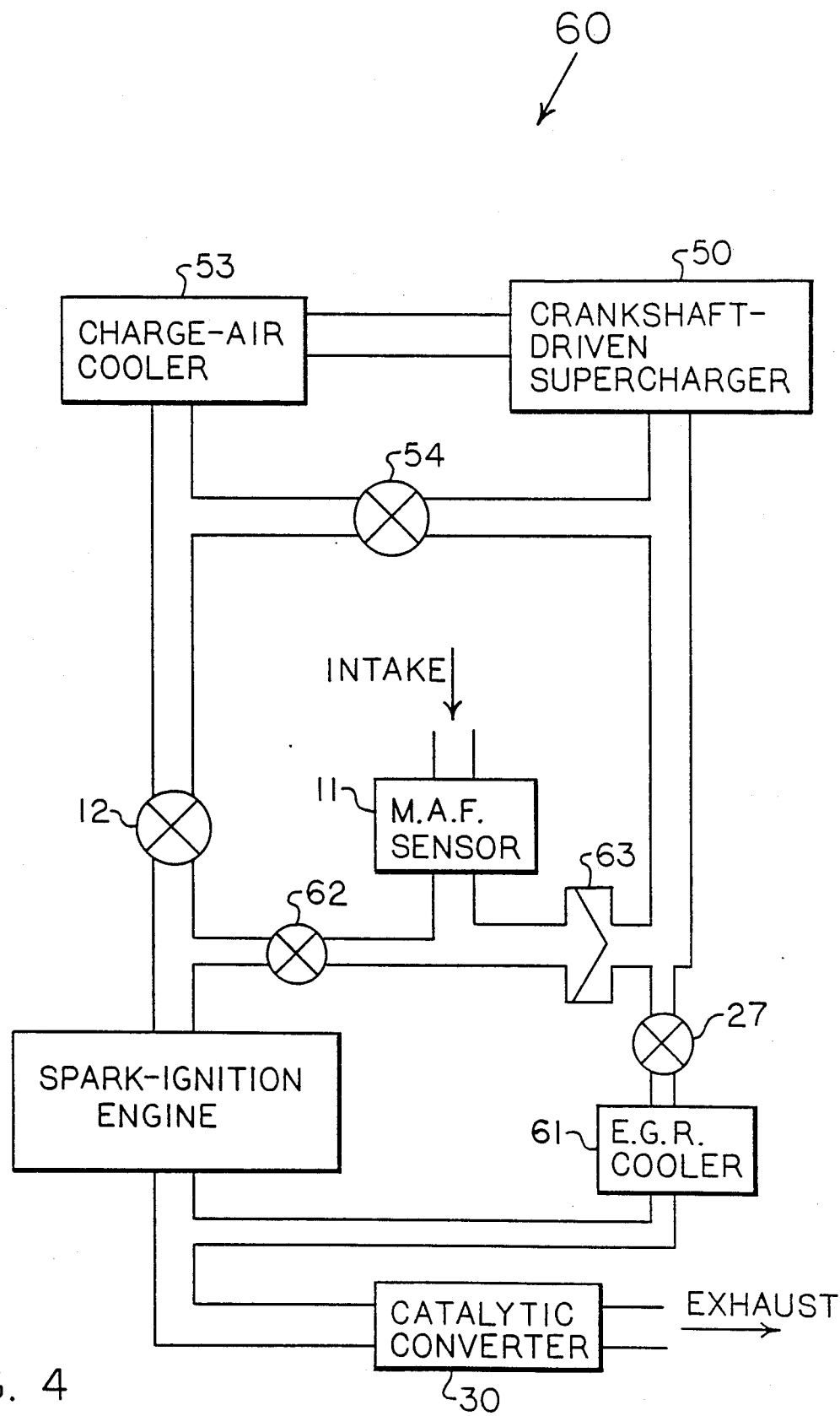
FIG. 4 is a diagram of another supercharged engine.

FIG. 4 reveals the main features of a supercharged engine assembly 60 which would consume a stoichiometric air-fuel mixture diluted only with recirculated exhaust gas. This third engine 60 thus combines features and components from each of the two previous engines 10 and 51. From the engine 10, the third engine 60 adopts the 3-way type of catalytic converter 30 and the EGR valve 27, but the EGR valve 27 now recirculates exhaust gas to a point upstream of the main throttle valve 12 and, in fact, upstream of the supercharger 50. This modification is needed because exhaust gas will not freely recirculate into pressurized charge-air being pumped into the engine cylinders by the supercharger 50. An EGR cooler 61 is added to cool and condense moisture from the exhaust gas before it reaches the EGR valve 27. From the supercharged, lean-burn engine 51, the third engine 60 adopts the crankshaft-driven supercharger 50 and its associated charge-air cooler 53 and by-pass valve 54.

The MAF sensor 11 now supplies filtered intake air both to the inlet of the supercharger 50 and directly to the cylinders of the engine 60 through the auxiliary throttle valve 62. An automatic valve 63 prevents reverse flow from the supercharger 50 to the MAF sensor 11.

During unboosted operation of the engine 60, the EGR rate is determined in large measure by the relative flow areas through the throttle valves 12 and 62. On the other hand, the auxiliary throttle 62, which provides all flow for engine idle and engine braking conditions, must be completely closed to prevent backflow whenever the by-pass valve 54 is closed enough to provide boost pressure. (A second automatically-closing valve could be added for this purpose.) Consequently, the EGR rate at high BMEP depends entirely on the EGR valve 27.

The reason for including the auxiliary throttle 62 in the first place is that the volume within the supercharger 50, charge-air cooler 53 and connecting ducting cannot be cleared of exhaust gas nearly as quickly as the main throttle 12 must respond to a closing command. Since the auxiliary throttle 62 provides nearly instant availability of air containing no exhaust gas, there is actually no need to clear exhaust gas from the supercharger 50 and associated components.

For applications where exhaust emission standards for nitrogen oxides require EGR, the naturally-aspirated engine 10 is preferred to the supercharged engine 60 simply because of the developmental difficulties associated with proper coordination, especially during transient conditions, of the valves 12, 27, 54 and 62 in FIG. 4. The volume within the supercharger 50 and related components in FIG. 4 also introduces a transient error in the mass air flow signal developed by the MAF sensor 11. Nevertheless, developmental difficulties can be alleviated somewhat by eliminating the by-pass valve 54 in FIG. 4. This simplification will diminish fuel efficiency less if the crankshaft-driven supercharger 50 were replaced by an exhaust-turbine-driven supercharger, or turbocharger. These last two modifications can also be applied singly or in combination to the lean-burn, supercharged engine 51 of FIG. 3. All such variations of supercharged engines to be used in the present invention employ high levels of intake charge dilution at high BMEP because of the reasons already stated with reference to the engine 51 of FIG. 3.

Even though the engine 60 has four separate valves used in the control of engine brake torque output, while the engines 10 and 51 each have only two such valves, the basic engine parameters under control are the same in each case. These parameters are the density of the engine intake charge and the amount of dilution of the intake charge. For a typical naturally-aspirated engine like the engine 10, the schedule of minimum BSFC (defined by the minimum points on curves like curve 43 in FIG. 2) requires that EGR displace at least 25% of the stoichiometric mixture that would be inducted in the absence of EGR. In addition, this minimum 25% displacement of air-fuel mixture would typically cover an effectively wide-open-throttle crankshaft speed range of as much as, or even more than, three-fourths of the range bounded by engine idle speed and the crankshaft speed of maximum power output. Supercharged engines like the engine 51 normally require even higher dilution for minimum BSFC at full boost pressure. By way of comparison, Diesel engines of course use very much higher dilution ratios because intake charge density is not restricted to control engine torque output.

Prior to collecting dynamometer data for any of the engines 10, 51 and 60 or any variations thereof, the engine to be tested should complete a lengthy break-in procedure to ensure a representative state of engine friction. In addition, dynamometer testing of naturally-aspirated engines and engines with crankshaft-driven superchargers should take place at an altitude above sea level representative of the altitude range in which the powertrain components of FIG. 1 are to operate.

Transmission Gear Selection Data

Figure 5:
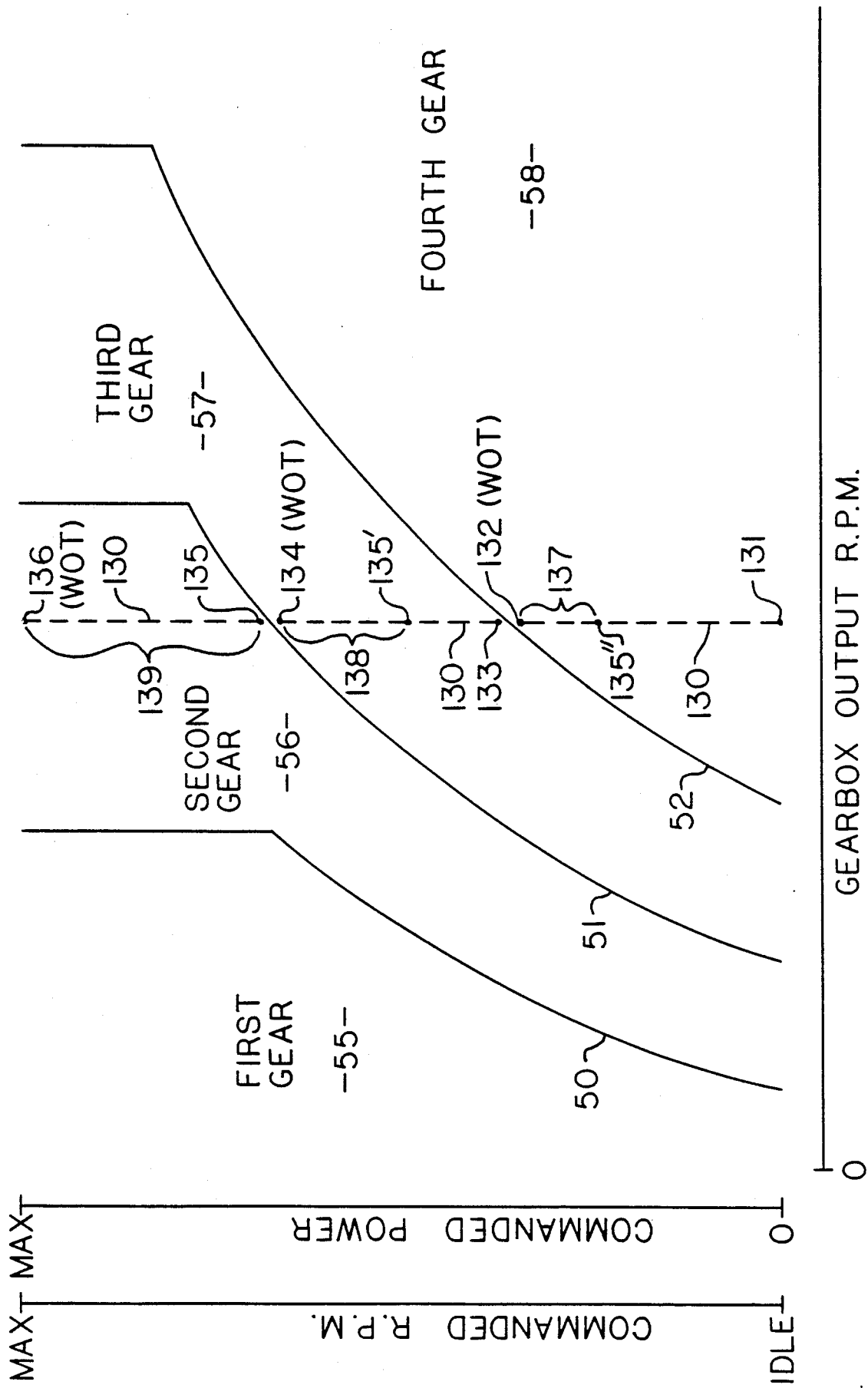
FIG. 5 is a transmission shift map for the powertrain components of FIG. 1.

In anticipation of FIG. 5 of the drawing, the varying conditions under which the powertrain components of FIG. 1 operate depend primarily on the speed of the associated passenger car and on the engine power output desired by the driver of the car. Since the speed of the associated passenger car does vary in direct proportion to the gearbox output RPM measured by the RPM sensor 24, the horizontal axis in FIG. 5 locates gearbox output RPM as derived from the sensor 24. Similarly, the vertical axis in FIG. 5 locates the particular power output level of the engine 10 being commanded by the driver through the accelerator pedal 17 and its associated position sensor 16. Therefore, the map of commanded power output versus measured gearbox output RPM as represented in FIG. 5 is a map which locates an operating point for the powertrain components of FIG. 1.

In general, an arbitrary powertrain operating point on the map of FIG. 5 has associated with it several choices of engine operating conditions made available by the various gear ratios in the gearbox 23. FIG. 5, then, will be a map of the best choice of gear ratio from the standpoint of minimum brake specific operating cost for the engine 10. This map of optimum gearbox ratio is in turn computer generated from gearbox ratios and the engine dynamometer data of which FIG. 2 is representative.

Beginning now with a single arbitrary powertrain operating point on the map of FIG. 5, the particular output RPM of the gearbox 23 for that point translates, via the four gear ratios in the gearbox 23, into four crankshaft speeds of the engine 10. These crankshaft speeds are candidate crankshaft speeds for the vehicle speed and commanded power output represented by the arbitrary powertrain operating point, and these candidate speeds can be established, and measured by either the engine RPM sensor 20 or the fluid coupling output RPM sensor 22, if the fluid coupling lock-up clutch 35 is fully engaged.

Any candidate crankshaft speeds that would require engine operation beyond the crankshaft speed at which the engine 10 develops its maximum wide-open-throttle power output are immediately eliminated from consideration, as are any candidate speeds too low to allow the commanded power (according to the location of the operating point on the map of FIG. 5) to be delivered to the input shaft of the gearbox 23. This last determination is made by consulting the dynamometer data plots, of which FIG. 2 is representative, for the candidate crankshaft speeds of the engine 10.

Two more required considerations may eliminate one or more of the remaining candidate operating speeds for the engine 10. First, the higher BMEP (brake mean effective pressure) values attained with greatly reduced EGR levels may not be acceptable because dilution of the air-fuel charge consumed by the engine 10 helps suppress autoignition. This consideration is also satisfied by consulting dynamometer plots like FIG. 2, and it becomes more prevailing as the maximum power output commanded by the fully depressed position of the accelerator pedal 17 more closely approaches the actual maximum power output available from the engine 10. As a good initial value, the maximum power commanded by the pedal 17 (and represented by the uppermost position of the vertical axis in FIG. 5) should be the power output corresponding to the minimum BSFC which appears on the plot like FIG. 2 valid for the crankshaft speed at which the engine 10 develops its maximum power output. This consideration of autoignition can be met by performing all dynamometer tests of the engine 10 with fuel of the lowest anticipated octane and by using an autoignition sensor to define the boundary of unacceptable areas of operation on all of the dynamometer plots like FIG. 2. The second consideration, that of unacceptable NVH prevalent at low RPM and relatively high BMEP, can also be accounted for simply by not considering appropriate areas on plots like FIG. 2 to be attainable by the engine 10. Alternatively, brake specific cost weighting factors can be combined with extremely high cost values for NVH and for autoignition in the appropriate areas of the plots like FIG. 2.

Finally, the brake specific cost values are compared for all candidate engine speeds remaining after all of the foregoing criteria have been applied. More specifically, a dynamometer plot like FIG. 2 but valid for each of the remaining candidate engine speeds is consulted to obtain the brake specific cost value associated with each of the candidate engine speeds. In other words, for example, a value on the brake specific cost curve 43 can be located by using the value of engine power output on the horizontal axis of FIG. 2 that is identical to the value of commanded power output located in FIG. 5 by the arbitrary powertrain operating point under consideration. This is done, not necessarily in FIG. 2, but in each of the dynamometer plots like FIG. 2 and valid for one of the remaining candidate engine speeds. The gear ratio in the gearbox 23 having the lowest brake specific cost associated with its candidate engine speed is of course the optimum gear ratio for the arbitrary powertrain operating point under consideration on the gear ratio selection map of FIG. 5.

In some instances, the comparison of the candidate brake specific cost values will not be necessary because only one or no candidate engine speeds will remain after applying the criteria that have been explained. If one candidate engine speed remains, then obviously the corresponding gear ratio is the optimum. If no candidate speeds remain, then the optimum gear ratio is the one that will provide the highest crankshaft speed of the engine 10 without exceeding the value at which maximum power is produced. In this last case, the power being commanded through the accelerator pedal 17 will not be achieved, but such power debits occur only at the highest levels of commanded power in FIG. 5 and can be reduced by lowering the maximum power commanded by the accelerator pedal position sensor 16. If, on the other hand, somewhat larger power debits are acceptable, then the maximum power commanded by the position sensor 16 can be increased past the initial value chosen as explained previously.

Considering now the gearbox upshift-downshift lines 50, 51 and 52 in FIG. 5, the overall gear selection procedure just explained can be applied repeatedly to a suitably large array of powertrain operating points distributed over the map of FIG. 5. When an appropriate computer program is used to accomplish this task, the area 55 will contain all the powertrain operating points for which the 1st gear ratio in the gearbox 23 is optimum, the area 56 will contain all points for 2nd gear in the gearbox 23, the area 57 will contain all points for 3rd gear, and the area 58 will correspond to 4th gear in the gearbox 23. As shown, the upshift-downshift lines 50, 51 and 52 partition the powertrain map into these areas 55, 56, 57 and 58 which often have shapes more or less as shown in FIG. 3.

Although not the ideal situation for the gearbox 23, some gearboxes have equally-spaced gear ratios by virtue of which each upshift between consecutive gear ratios reduces the gearbox input shaft speed by the same percentage when the gearbox output shaft speed remains unchanged during the upshift. Such equally-spaced gear ratios make possible a method of generating a powertrain map of optimum gear ratios with only straight line segments separating the areas for each gear ratio. This method utilizes the second vertical scale shown in FIG. 5, that for commanded crankshaft RPM of the engine 10 as related to the vertical scale of commanded power by an artificial-maximum-BMEP operating schedule for the engine 10.

In more detail, an operating point at a particular vertical position on the map of FIG. 5 and just to the right of line 52 will determine a specific crankshaft RPM of the engine 10. This same RPM value occurs at the same vertical height on the second vertical scale, that for commanded RPM. As the operating point moves along the righthand edge of shift line 52, it will continue to generate a non-linear scale for the vertical axis of commanded RPM in the same manner as just explained for a single operating point. If the map of FIG. 5 is now replotted to make the commanded RPM scale, rather than the commanded power scale, linear, then the non-vertical segment of shift line 52 will in the process become straight. If the gear ratios in the gearbox 23 were equally-spaced, then the other shift lines 50 and 51 would also become straight. (Other factors can cause this procedure to straighten every shift line even if not all ratio gaps are equal. One such factor is using the engine 51 in place of the engine 10.) My U.S. patent application filed on Sept. 3, 1985, and assigned Ser. No. 771,660 considers this and other alternative methods for generating and using the gear ratio selection map of FIG. 5. This patent application Ser. No. 771,660 is incorporated herein by way of reference.

Allowing a hypothetical number of equally-spaced gear ratios in the gearbox 23 to approach infinity produces some interesting results. First, the artificial-maximum-BMEP engine operating schedule that relates the vertical scales of commanded power and commanded engine RPM to each other in FIG. 5 becomes the operating schedule of minimum brake specific cost for operation of the engine 10 throughout its crankshaft speed range. Which is to say that the relationship between commanded power and commanded engine RPM would be that given by the point of minimum brake specific cost on curve 43 in FIG. 2 and by all such minimum points throughout the crankshaft speed range of the engine 10. Furthermore, the optimum gearbox ratio can be calculated simply as the ratio of commanded engine RPM to measured gearbox output RPM. Consequently, the data directly relevant for optimum operation of a powertrain employing a CVT (continuously variable transmission) is not the gear ratio selection map of FIG. 5, but rather commanded crankshaft RPM as derived from power output commanded through the accelerator pedal 17 and from the engine operating schedule of minimum brake specific cost; this data would constitute the CVT engine operating schedule for the engine 10. Going even further, CVT ratio is usually best controlled to eliminate an error signal of the difference between commanded engine RPM and actual engine RPM as measured by a sensor. These and other aspects of CVT drive-by-wire control are considered in more detail in my U.S. Pat. No. 4,xxx,xxx (Ser. No. 689,185, filed Jan. 7, 1985), which is incorporated herein by wa of reference.

Gear Selection Data for Alternative Types of Discrete-Ratio Transmissions

The fluid coupling assembly 21 and 4-speed powershift gearbox 23 together constitute a powershift transmission that further combines with the engine 10 to form a power unit. This power unit has four distinct operating modes, the performance of each of which may be closely approximated using stationary dynamometer data obtained by testing the engine 10 alone. In other words, the four different gear ratios in the gearbox 23 all achieve high efficiency of power transmission so long as the fluid coupling lock-up clutch 35 is fully engaged. Since the engagement schedule that will be explained for the lock-up clutch 35 is in fact very extensive, the map of optimum gear selection for the gearbox 23 can be successfully generated, as already explained with reference to FIG. 5, without accounting for the substantial power that is dissipated in the fluid coupling assembly 21 during a brief, initial stage of acceleration of the associated passenger car. In contrast, the torque converter in some automatic transmissions remains intermittently active to help bridge the gap between gear ratios that are widely spaced to achieve a wide overall ratio range.

Now considering such wide-ratio automatic transmissions, the torque converter lock-up clutch in heavy-duty truck transmissions often passes through one complete cycle of release and engagement for each upshift completed in sequence. Release accompanies the upshift itself, and the subsequent engagement serves to split the ratio gap much as would a 2-speed drive axle. Unlike a 2-speed axle, however, a torque converter cannot multiply torque without incurring a significant loss in the efficiency of power transmission. Consequently, two complete sets of stationary dynamometer test data are necessary for successful application of an overall procedure like the one explained with reference to FIG. 5.

Both of these complete sets of data in a sense apply to the engine and torque converter operating together as a unit, one set for operation with the converter lock-up clutch fully engaged and the other for operation with the lock-up clutch released. The set of data for operation with the lock-up clutch fully engaged can obviously be obtained by dynamometer testing only the engine in exactly the same manner as already described with reference to FIG. 2. In actual practice, the other (engine-converter) set of data is most easily obtained by combining the engine-only dynamometer results represented by FIG. 2 with dynamometer results obtained by testing the torque converter alone. The combined engine-converter data will follow exactly the same form as the engine-only data, but output power and output RPM will now apply only to the torque converter output shaft, rather than to either the converter output shaft or the engine crankshaft (as when the lock-up clutch 35 is fully engaged.)

Returning again to FIG. 2, the generation of engine-converter data curves corresponding to the curves 40, 41, 42 and 43 will now be described. To begin, FIG. 2 will no longer apply to constant crankshaft RPM, but instead to constant RPM of the torque converter output shaft, which directly drives the input shaft of the associated powershift gearbox. At any particular lateral position on a particular engine-converter data plot like FIG. 2, dynamometer data from testing the torque converter by itself is applied to the particular converter output values of power and RPM to yield the converter input values of the same parameters. Since these converter input values of power and RPM are identical to engine crankshaft power and RPM, they are used to consult the appropriate engine-only data plot like FIG. 2. (Crankshaft RPM locates the particular engine-only plot like FIG. 2, and crankshaft power locates the lateral position on that plot.) At this point, power transmission efficiency of the torque converter may be calculated from the input and output values of power. Next, engine values of throttle position, EGR valve position and fuel injection pulse width are taken from the particular engine-only data plot and transferred directly to the original lateral position on the engine-converter data plot. BSFC is, in contrast, no longer an engine value, but must be modified to describe the performance of the engine and torque converter operating as a unit. Consequently, BSFC (or brake specific cost) is transferred to the engine-converter data plot only after it is multiplied by the reciprocal of the current power transmission efficiency of the torque converter. The rest of the engine-converter plot like FIG. 2 is generated by repeating the foregoing procedure in its entirety using the original converter output RPM over the range of converter ouput power from zero to the maximum available at the original converter output RPM.

The foregoing method for generating an engine-converter data plot modeled after FIG. 2 is best implemented by a computer subroutine. This subroutine is repeatedly applied over a progression of representative torque converter output shaft speeds of the engine and torque converter operating together as a single power-producing unit. The result of this repeated application is of course four new three-dimensional data surfaces located above the plane of brake power output available at the torque converter output shaft versus operating RPM of the converter output shaft. As in the case of engine-only data surfaces, there is one surface for each of engine throttle position, engine EGR valve position, engine fuel injection pulse width, and the brake specific cost of operating the power unit.

These engine-converter data surfaces have a few interesting characteristics. Most notably, as the torque converter output shaft RPM approaches the crankshaft RPM at which the engine develops its maximum wide-open-throttle power output, the torque and power available at the converter output shaft approach zero. High values of output power, and especially of torque, are available at the converter output shaft only when the converter output RPM is distinctly below the crankshaft RPM of maximum engine power output. Next the three-dimensional engine-converter data surfaces are like the engine-only data surfaces in that they do not encompass areas where unacceptable engine operation would occur; here, relevant considerations include autoignition, NVH (greatly moderated by the torque converter) and crankshaft speed beyond the RPM at which the engine develops its maximum power output. And last, brake specific cost is the only data parameter useful at converter output shaft speeds below the normal engine idle RPM. At these low speeds, an extremely high but finite value of brake specific cost will ensure that operation with the converter lock-up clutch released is selected for near-zero vehicle speeds. (Engine-only brake specific cost data does not extend below the normal engine idle speed.)

Only a few details of the overall method for computer generation of a map of gear selection data similar to FIG. 5 need modification in order to accomodate the case where a torque converter lock up clutch is cycled to help bridge gearbox ratio gaps. Most obviously, the candidate RPM values calculated from gearbox output RPM and gearbox gear ratios now become candidate speeds for the torque converter output shaft. Since the converter lock-up clutch can be either released or engaged, each candidate converter output speed will further include two Candidate powertrain operating modes. Exactly the same criteria as explained previously are used to eliminate unacceptable powertrain operating modes, and the remaining candidate powertrain operating modes are compared for minimum BSFC or brake specific cost in the manner previously explained with reference to FIG. 5. Engine-only data provides the BSFC or brake specific cost of operation in any gearbox ratio with the converter lock-up clutch engaged, and the additional engine-converter data serves operation in any gearbox ratio with the lock-up clutch released. Also worth mentioning is the fact that considerations in addition to brake specific cost can influence selection of the optimum powertrain operating mode. For instance, the 1st and 2nd gear ratios of a 5-speed gearbox might be limited to operation with the converter lock-up clutch released to thereby somewhat increase vehicle operating smoothness as well as life of the lock-up clutch.

Splitting gear ratio gaps by cycling the engagement of a torque converter lock-up clutch will clearly alter the appearance of data like FIG. 5. Because of the inefficiency inherent in torque converters, most powertrain operating modes obtained with the lock-up clutch released will be restricted to the areas of high engine power output inaccessible with the lock-up clutch engaged. As a direct consequence, sufficiently narrow ratio gaps will eliminate many areas dedicated, on a map like FIG. 5, to operation with the lock-up clutch released. Any small remaining areas are often best eliminated entirely in the interest of vehicle driveability.

In passenger car use, smooth gear shifts can have more importance than does completely optimized fuel economy. Although an unlocked torque converter will smooth gear shifts, the preferred approach is to secure acceptable smoothness through refinement of the associated powershift gearbox. Even so, the following modifications of the method associated with FIG. 5 may be used when an unlocked torque converter is relied upon to enhance shift smoothness. Since upshifts are usually more difficult to accomplish smoothly than are downshifts, operation in certain transmission ratios with the torque converter locked up will be reached only through a downshift. Stated in another way, the complete schedule for sequential downshifting will include at least one lock-up gear ratio not included on the complete schedule for sequential upshifting. (Engagement of the lock-up clutch without shifting gear ratios is treated as an upshift, and release as a downshift.) It is this feature of two shift schedules which requires modification of the method explained with reference to FIG. 5. The primary modification is to use the method of FIG. 5 to generate two separate maps for selection of the optimum transmission operating mode, one map for upshifts and a different map for downshifts.

In more detail, certain gearbox ratios will be acceptable for use with the torque converter locked up, but require that the converter be unlocked upon initiation of an upshift. These lock-up ratios are included in the downshift map, but treated as unavailable for computer generating the upshift map. Because the maps are not identical, the optimum transmission operating modes determined from the two maps will not always coincide. If not, the downshift map will always have priority except when the need for an upshift from the existing transmission mode is indicated by both shift maps. In addition, control of the torque converter lock-up clutch must include provision for releasing the clutch whenever an upshift is initiated from one of the lock-up ratios not included on the upshift map.

Another alternative type of transmission uses different split-power-paths to pass various percentages of engine output power through the associated torque converter. In a hypothetical example, 1st gear passes all of engine power through the torque converter, 2nd gear passes the majority of power through the converter, 3rd gear passes only a minority of power through the converter, and 4th gear by-passes all power around the converter. In such a situation, the entire combination of the engine and transmission replaces the engine 10 in the overall dynamometer test procedure represented in part by FIG. 2. This overall test procedure is completed in its entirety once for each of the four transmission ratios, but each data plot like FIG. 2 would now be referenced to a particular RPM value of the transmission output shaft. This new referencing allows the optimum gear ratio map like FIG. 5 to be determined with no need to calculate candidate engine speeds.

Just as the transmission in a powertrain can require additional dynamometer data such as engine-converter data, so too can the engine in the powertrain spawn additional powertrain operating modes. To introduce an example of this, valve-selector systems have in the past been used on passenger car engines to selectively disable the valve-opening apparatus of certain cylinders of the engine. While such systems did lack complete refinement, they aided fuel economy by both reducing engine air pumping loss and improving burn rate under light torque loads. In order to incorporate a valve-selector system in the engine 10 of FIG. 1, the dynamometer testing procedure described herein for the engine 10 would be completed for each engine operating mode made possible by the valve-selector system.

Drive-by-Wire Control System

Figure 6:
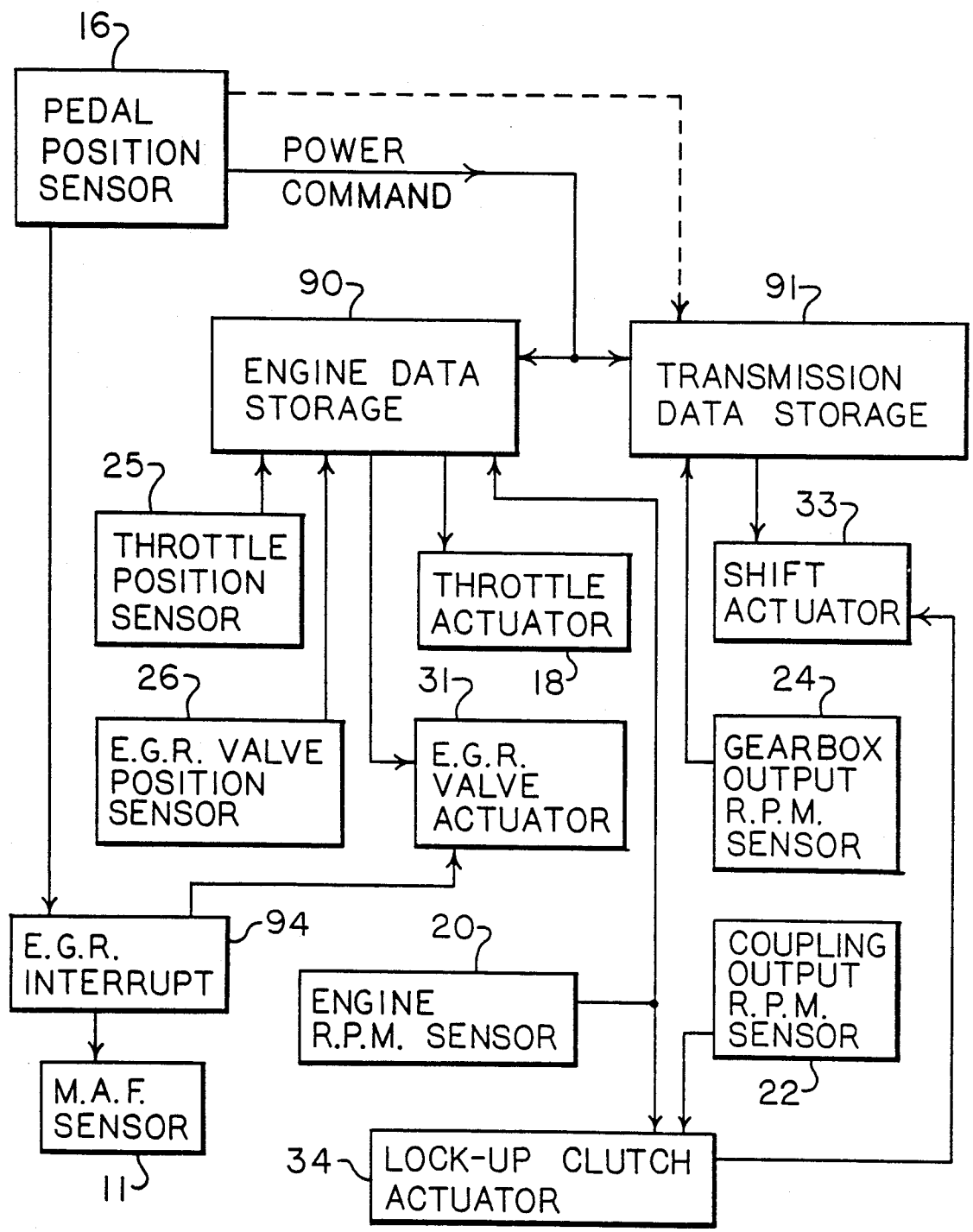
FIG. 6 is a block diagram of the drive-by-wire control system of FIG. 1.

FIG. 6 of the drawing presents a block diagram showing the drive-by-wire control system 15 and its associated sensors and actuators in more detail than is included in FIG. 1 for these particular components. Turning now to FIG. 6, the more essential construction and operating features of the control system 15 will be explained first, and ancillary details later.

Beginning with the sensor 16 for position of the accelerator pedal 17, the position signal from the sensor 16 is in reality the command signal for power output to be provided at the power output shaft of the gearbox 23 for the purpose of propelling the associated passenger car. The pedal position sensor 16 provides this power command signal as an input signal to each of two main memory-and-control units 90 and 91 within the digital electronic control system 15. One of these memory-and-control units, the engine data storage and control unit 90, contains in read-only-memory the three engine-only data surfaces which intersect the plane of FIG. 2 along the curves 40, 41 and 42. The other memory-and-control unit, the transmission shift selection data storage and control unit 91, contains in its read-only-memory the entire map of gear selection data as described with reference to FIG. 5 for the engine 10 and gearbox 23.

In order that the transmission shift data storage unit 91 can use a suitable known technique to address the data of FIG. 5 stored in its read-only-memory (ROM), an input signal indicating the existing power output shaft speed of the gearbox 23 is needed in addition to the power command input signal from the sensor 16. The RPM sensor 24 therefore supplies its signal for the actual output shaft speed of the gearbox 23 to the transmission data storage unit 91. With the ROM storage address of the optimum gear ratio in the gearbox 23 thus determined, the transmission data unit 91 does retrieve from its ROM a code for the gear ratio in the gearbox 23 that is currently the best of the available ratios. The gearbox shift actuator 33 receives a corresponding signal from the unit 91 and enables the currently optimum ratio in the gearbox 23. As is characteristic of computer control in passenger cars, the transmission data unit 91 repeats this gear ratio optimization process many times each second. In fact, both of the data storage and control units 90 and 91 can be incorporated into a single digital electronic module which also carries out many other conventional engine and transmission control functions.

Within the engine speed constraints imposed by the choice of gear ratios available in the gearbox 23, the shift actuator 33 enables the gear ratio optimum for minimized brake specific cost of operating the engine 10 at the commanded power level while the associated passenger car travels at its existing speed. Changes in either or both of commanded power output and vehicle speed can therefore necessitate shifting to a different one of the areas 55, 56, 57 and 58 in FIG. 5 and thus to a new optimum ratio in the gearbox 23. As just one example of this, even a small increase in a relatively modest level of power commanded through the accelerator pedal 17 can initiate a downshift of the gearbox 23. As another example, increasing vehicle speed can obviously require an upshift of the gearbox 23. Nevertheless, the engine 10 will not develop the commanded power level unless the engine data storage and control unit 90 also performs its function.

This engine data storage unit 90 in effect continuously selects from its ROM the data plot which is like FIG. 2 and which is current for the existing crankshaft speed of the engine 10 as measured by the engine RPM sensor 20. So the signal from the RPM sensor 20 is delivered to the engine unit 90 as one of two primary input signals, the other being the power command signal from the sensor 16. Using these primary inputs to address its ROM data for the engine 10, the engine unit 90 in effect enters the current data plot like FIG. 2 at the lateral position dictated by the power command signal from the sensor 16. Among the values thus retrieved from ROM data for the engine 10 are the particular positions of the engine throttle 12 and EGR valve 27 that will in combination best achieve the commanded power output at the existing crankshaft speed of the engine 10. Fuel injection pulse width can also be stored in and retrieved from the ROM data, but this would be expected pulse width because actual pulse width is determined by the mass air flow sensor 11 acting in conjunction with the exhaust gas oxygen sensor included in the engine assembly 10.

For comparison to the optimum position of the engine throttle 12 as retrieved from ROM data, the engine data unit 90 receives a feedback signal indicating the actual position of the throttle 12. The throttle position sensor 25 provides this feedback signal, and the engine unit 90 activates the throttle actuator 18 to thereby eliminate any difference between the optimum and actual positions of the throttle 12. In taking this comparison-and-correction action, the engine data unit 90 utilizes known techniques for proportional, integral and derivative feedback control of the throttle 12 through the actuator 18. Similarly, the engine data unit 90 exercises proportional, integral and derivative feedback control of the EGR valve 27 to thereby equalize the actual position of the valve 27 to the optimum position as continuously retrieved from the ROM data for the engine 10. The EGR valve position sensor 26 provides the engine unit 90 with the necessary feedback signal for actual position of the EGR valve 27, and the EGR valve actuator 31 makes the actual adjustments in position of the EGR valve 27.

Even if the engine 10 were replaced by the supercharged engine 51 of FIG. 3, the sensor-actuator pair of components 25 and 28 would still interface with the engine data unit 90 to provide control of the engine throttle 12, but according to ROM data for the supercharged engine 51. The EGR control components 26 and 31 would, in contrast, be replaced in FIG. 6 by the supercharger by-pass valve control components 55 and 56 from FIG. 3. In the case of the other supercharged engine 60 from FIG. 4, the engine data storage unit 90 would regulate the brake torque output of the supercharged engine 60 by interfacing with four, rather than with two sensor-actuator component pairs. As yet another example, the data storage unit 90 would interface with only one pair of sensor-actuator components in the case of a conventional Diesel truck engine.

Another example of variations in the control system components of FIG. 6 is suggested by realizing that the engine data unit 90 functions in what is actually the command side of the overall position control of the engine throttle 12 and of the EGR valve 27. This approach is preferred for its comparative simplicity and because it enhances proportional-integral-derivative control of the valves 12 and 27. Even so, the arrangement of FIG. 6 could be modified to place the engine data unit 90 in the feedback side of the overall control for the valves 12 and 27. In such a modification the engine throttle 12 would, for example, be adjusted not in response to command and feedback values of its own position, but rather in response to command and feedback values for power produced by the engine 10. In other words, the engine unit 90 could retrieve from its ROM engine data a value of power output currently being produced by the engine 10 based on the measured crankshaft RPM signal from sensor 20 and on the measured position signals from the throttle position sensor 25 and the EGR valve position sensor 26. This indirectly measured power output value from ROM data would serve as a master feedback signal to be equalized with the power command signal from the pedal position sensor 16. Appropriate adjustments of the valves 12 and 27 would achieve the equalization.

So a multitude of variations in the control system of FIG. 6 centers on just the engine data storage and control unit 90. Nevertheless, all of these variations of the present invention will be operative to accomplish two things. First, the brake torque output developed by the engine 10 will be regulated to the value necessary, at the existing crankshaft speed of the engine 10, to provide the power output currently being commanded by the accelerator pedal sensor 16. Second, the combination of particular positions of the valves 12 and 27 will be in accord with operation of the engine 10 at minimum brake specific cost as explained with reference to FIG. 2. Thus, the control system of FIG. 6 plays a key role in the preparation of the intake charge consumed by the engine 10. In addition then, the data surfaces, of which the curves 40 and 41 are a part, together constitute a calibration for optimized operation of the engine 10.

Another multitude of variations within the scope of the present invention centers on the transmission shift data storage and control unit 91. Each of these variations is operative to select, from among the gear ratios available in the gearbox 23, the ratio which will incur the lowest brake specific cost of operating the engine 10 to produce the power currently being commanded by the accelerator pedal sensor 16 while the associated vehicle is traveling at its existing speed. As just one example of these variations, the map of FIG. 5 could be discarded in favor of continuous comparison of the brake specific costs of candidate powertrain operating modes.

The control system of FIG. 6 operates as explained to automatically impose on the engine 10 the EGR calibration of which the curves 40 and 41 in FIG. 2 are only a small part. During transient conditions, it can be especially difficult for the throttle actuator 18 and the EGR valve actuator 31 to adhere to this calibration. Consequently, the EGR actuator 31 should have a faster maximum closing rate than does the throttle actuator 18 because the mass air flow sensor 11 can accomodate too little EGR (and even overshoot of the EGR actuator 31 upon closing) simply by increasing the fuel injection pulse width; but too much EGR can cause misfire of the engine 10. For this same reason, the maximum opening rate of the EGR actuator 31 should be less than that of the throttle actuator 18.

The following is just one of many ways in which subcomponents of the EGR actuator 31 can be selected and arranged to secure for the EGR valve 27 the desired combination of a relatively fast closing rate with a relatively slow opening rate. A source of constant vacuum would be applied through a fixed-area orifice to a diaphragm, which would in turn open the EGR valve 27 against the force of an integral spring. This first orifice would consequently be sized to limit the maximum opening rate of the EGR valve 27 to significantly less than that of the engine throttle 12. In contrast, full opening of a comparatively large variable-area orifice venting the diaphragm vacuum chamber to atmosphere would allow the diaphragm spring to close the EGR valve 27 very rapidly. The engine data unit 90 would of course employ an electric solenoid to regulate the variable area of the bleed orifice, which would be opened by spring force.

Moving now to the less basic components shown in FIG. 6, the lock-up clutch actuator 34 electronically compares input shaft and output shaft speeds of the fluid coupling assembly 21. If the output shaft speed of the coupling 21 is above both the idle speed of the engine 10 and a threshold percentage of the existing input shaft speed of the coupling 21, then the actuator 34 will engage the lock-up clutch 35. The threshold percentage for lock-up is selected for acceptable engagement smoothness, and the threshold percentage may vary, using ROM space, as a function of crankshaft speed of the engine 10. If, on the other hand, the crankshaft speed of the engine 10 threatens to fall below its idle value, then the actuator 34 will release the lock-up clutch 35. To allow the actuator 34 to accomplish these engagement and release functions, input signals from the engine RPM sensor 20 and the coupling output RPM sensor 22 are supplied to the actuator 34. The input signal from the engine RPM sensor 20 of course also indicates input shaft speed of the fluid coupling 21.

Also shown in FIG. 6 is a lock-up signal delivered from the lock-up actuator 34 to the gearbox shift actuator 33. In response to this lock-up signal, the shift actuator 33 will upshift the gearbox 23 only after the lock-up clutch 35 is engaged. The lock-up schedule for the fluid coupling assembly 21 is, as a result, very extensive and normally encompasses part of 1st gear and all of the remaining three gear ratios in the gearbox 23. Other variations of the present invention may not require a lock-up signal; examples of this are provided by some of the variations using both engine-only data and engine-converter data.

The power dissipated in the fluid coupling assembly 21 when its lock-up clutch 35 is released inherently provides a needed reduction in power delivered to the gearbox 23 when the associated passenger car is first accelerated from a stop. Further reduction may be needed and can be acquired in several ways. For instance, the power command signal from the sensor 16 can be attenuated at low vehicle speed as measured by the RPM sensor 24 for output shaft speed of the gearbox 23. However, opening of the throttle 12 should remain accentuated at very low vehicle speed to help duplicate the low speed response of a conventional powertrain using a torque converter in place of the fluid coupling 21. The fluid coupling 21 does improve efficiency both directly and indirectly in comparison to a lock-up torque converter because the much closer matching of input and output speeds in a fluid coupling also allows earlier lock-up clutch engagement.

While the error in engine power output that results from fluid coupling slippage only benefits the powertrain components of FIG. 1, the same is not true of other variations of the present invention. If a torque converter is used in conjunction with engine-only and engine-converter data for the purpose of bridging widely-spaced gearbox ratios, then the error in power output will still benefit the associated vehicle during acceleration from a complete stop. At all other times, though, the engine data storage unit like the unit 90 should regulate engine torque output in response to the measured RPM of the torque converter output shaft, not the RPM of the engine crankshaft. Therefore, some variations of the present invention require that the RPM feedback signal supplied to the engine data storage unit like unit 90 be appropriately switched between crankshaft speed and torque converter output speed.

The last remaining component in FIG. 6, the EGR interrupt device 94, serves its primary purpose only when the driver commands maximum power output by depressing the accelerator pedal 17 fully. At this time, the interrupt device 94 sends an override signal causing the EGR actuator 31 to fully close the EGR valve 27.

The interrupt device 94 concurrently sends a signal causing the mass air flow signal generated by the mass air flow sensor 11 to be multiplied by a factor that will provide suitable full-power enrichment of the air-fuel charge consumed by the engine 10. This enrichment requires "open-loop" operation of the exhaust oxygen sensor, and it serves to suppress autoignition as well as to further increase engine power output. The force of an extra spring should oppose only the last increment of movement of the accelerator pedal 17 so that the driver can easily distinguish between the absolute maximum power and the maximum power available with the fuel economy benefit of EGR.

As a secondary function, the EGR interrupt device 94 can reduce or eliminate EGR following a cold start of the engine 10. At the same time when EGR is reduced for cold engine operation, the gearbox 23 can be allowed to follow its normal shift schedule, but with the lock-up clutch 35 always released to improve cold-engine driveability and to help offset the higher engine torque produced with lower EGR. (Slippage in the fluid coupling 21 causes the engine data storage unit 90 to counteract the extra crankshaft speed by reducing the opening of the throttle 12.)

If the gasoline engine 10 cannot tolerate EGR immediately following a cold start, then the shift map of FIG. 5 may be too aggressive for cold engine operation, even with the lock-up clutch 35 continuously released. This is especially true because the engine data surface of throttle position, as exemplified by the curve 40 in FIG. 2, will obviously become inaccurate during operation of the engine 10 without EGR. One effect of this inaccuracy is to bias the shift map of FIG. 5 toward higher BMEP operation of the engine 10, but this effect can be avoided by including in ROM storage an additional data surface of throttle position which describes engine operation without EGR. Even if this extra data surface is included in ROM, it may still be desirable to also include an additional, less aggressive shift map for use when the engine 10 is cold.

An alternative for cold starts utilizes the approach, already mentioned, which dispenses entirely with a transmission shift map like FIG. 5. Instead, appropriate circuitry would continuously iterate through the applicable procedure already explained for generating the shift map of FIG. 5, but this circuitry would use only current values of commanded power and gearbox output RPM as continuously updated from the corresponding sensors 16 and 24. When the engine 10 is cold, an additional weighting factor can be included in the calculation of candidate brake specific costs to thereby bias the resulting gearshift schedule toward lower BMEP operation of the engine 10. This weighting factor for a less aggressive shift schedule can progress smoothly to zero as the engine 10 warms up, and it can be increased an extra amount to help eliminate any need for an additional surface of throttle position data which describe engine operation without EGR.

Turning now to secondary considerations for some of the components of FIG. 6, the engine data storage and control unit 90 can store engine dynamometer data that is slightly altered to permit engine braking. As shown in FIG. 2, actual engine power output will in general reach zero before the throttle 12 reaches its idle position, but the throttle actuator 18 should preferably return the throttle 12 to its idle position whenever the accelerator pedal 17 is fully released. Since the released position of the pedal 17 commands zero power output, the throttle position curve 40 in FIG. 2 should be extended to idle position and zero power assigned to that position even though the actual power output there will be negative. Assigned values of power output will then increase with throttle position to join the curve of actual power output at some quite small power level on the curve of actual power. The very low power levels of all throttle position curves like the curve 40 should be altered in this way.

Another extension occurs at the other end of the curves 40 and 41 for position of the throttle and EGR valves. At this end of the curves, the accelerator pedal position sensor 16 can suddenly command maximum power output when the engine 10 is operating at any crankshaft speed. Therefore, the horizontal axis of each data plot like FIG. 2 must extend to the maximum power output commanded by the sensor 16. On these extensions, all curves like the curves 40, 41, 42 and 43 remain constant at values for the highest brake torque condition measured during dynamometer testing and free of both autoignition and unacceptable NVH. Unlike extension of the curves to allow engine braking, these other extensions are essential additions to the data stored in the ROM of the engine data storage and control unit 90.

As suggested earlier, inclusion of curve 42 and other such pulse width curves in the ROM of the engine data unit 90 is not required, but will provide a usable pulse width in the event of failure of the MAF sensor 11. Comparison of the expected pulse width to the actual pulse width can also serve to detect operational faults such as sticking of the EGR valve 27 or excessive exhaust back pressure.

Moving now to the other main ROM data storage unit, the transmission data storage and control unit 91, the optimum gear selection data of FIG. 5 includes no provision to protect against oscillating shifting of the gearbox 23. The following is just one of the many techniques that will introduce the necessary hysteresis into the shift schedule enforced by the transmission data unit 91. The unit 91 will still determine the need for upshifts of the gearbox 23 exactly as already explained, but only the need for downshifts is to be determined using a feedback value about 5% in excess of the actual output shaft speed of the gearbox 23. Selective amplification of the feedback signal from the RPM sensor 24 will provide the desired hysteresis and also prevent the engine 10 from fully reaching its maximum crankshaft speed as the immediate result of a downshift.

A further refinement of the transmission data unit 91 again relates to shift frequency and again offers many methods by which it can be achieved. One particularly good approach first recognizes that only upshifts of the gearbox 23 can be consistently delayed without incurring an unnecessary error between actual and commanded values of power output. The next realization is that an upshift is not likely to be closely followed by an offsetting downshift unless the upshift occurs in response to a decrease in commanded power output. So delaying upshifts for several seconds will reduce shift frequency, but such delays should be restricted to upshifts caused by a distinct release in position of the accelerator pedal 17. This technique is represented in FIG. 6 by a dashed input line from the accelerator pedal sensor 16 to the transmission control unit 91.

As implied previously, the engine data unit 90 must employ appropriate modifications in order to accomodate variations in the hardware of FIG. 1. If the fluid coupling 21 were replaced by a lock-up torque converter in turn used to bridge increased gaps between gear ratios in the gearbox 23, then the engine data unit 90 would store complete engine-converter data as well as complete engine-only data. In addition, the engine data unit 90 would consult the proper set of data depending on whether the torque converter clutch were locked or unlocked. The required input signal from the lock-up clutch actuator 34 to the engine data unit 90 is not shown in FIG. 6 because adding more gear ratios to the gearbox 23 is the preferred way of achieving a wide overall ratio range. (The gearbox 23 does not have more than four forward gear ratios only because 3-speed and 4-speed powershift gearboxes ar now the norm for pasenqer cars.)

In the case where a torque converter without a lock-up clutch would transmit a different percentage of engine power for each gear ratio, every complete set of data stored in the engine data unit 90 would be referenced to the speed of the transmission output shaft. Obviously then, the engine data unit 90 would receive its primary RPM feedback signal only from the RPM sensor 24, rather than from the engine RPM sensor 20 or the coupling output RPM sensor 22. This approach can be used for many other transmission types, but it is not preferred in the case for Which one set of data differs from another only by a constant RPM scaling factor. (As an example of this, engine-only data for the engine 10 can provide a very good approximation of the 2nd gear powertrain performance available at the power output shaft of the gearbox 23 with the lock-up clutch 35 engaged. All that is necessary is to scale the crankshaft RPM of the engine-only data by dividing the crankshaft RPM by the speed ratio of 2nd gear in the gearbox 23. Performance available using the other speed ratios in the gearbox 23 is similarly obtained by appropriately scaling the engine-only data. Thus, as an alternative to the approach already explained for drive-by-wire control of the powertrain components of FIG. 1, one complete set of scaled data would be stored in the engine data unit 90 for each of the four speed ratios available in the gearbox 23. Each of these four sets of data would be referenced to the gearbox output RPM as measured by the RPM sensor 24, and the engine data unit 90 would consult the correct set of data depending on the speed ratio currently being used to transmit power through the gearbox 23. While this alternative approach can be aplied more broadly, it is usually more costly to implement than is the approach already explained with reference to FIG. 1.)

Finally, the form which the shift actuator 33 will take depends on design details of the powershift gearbox 23. For instance, the shift actuator 33 can be of a type that will shift out of sequence only if the gearbox 23 can change gear ratios out of sequence. In general though, the shift actuator 33 can follow conventional practice by incorporating one hydraulic spool valve for each sequential pair of gear ratios between which upshifts and downshifts are completed. Each of these spool valves would be shuttled by two electrical solenoid valves with which the spool valve would combine to form an electromechanical flip-flop. Since the mechanical state of each spool valve would be indicated by its electrical state as a flip-flop, a separate communication channel to indicate the existing gear ratio of the gearbox 23 would be unnecessary. If, on the other hand, a continuously variable transmission were to replace the discrete-ratio gearbox 23, then the transmission data unit 91 would need a separate feedback signal related to the exiting transmission ratio, but not shown in FIG. 6. If a manually-shifted transmission were to replace the automatically-shifted gearbox 23, then the shift actuator 33 would become a visual display for indicating the optimum gear ratio to the driver, who would be relied upon to enable the optimum gear ratio selected by this variation of the present invention.

Improved Discrete-Ratio Transmissions

As suggested earlier with reference to the prior art, the fuel economy improvements available with continuously variable transmissions should not be considered relative to current production hardware, but relative to improvements that can be achieved by applying existing technology to passenger cars (and other uses) which retain the discrete-ratio type of transmission. As perhaps the most important example of the shortcomings of production hardware, current automatic transmissions continue to include a torque converter which does expand the overall ratio range of the transmission, but which does so at a significant cost in the efficiency of power transmission. Moreover, accentuated slippage and torque multiplication occur at the same relatively low torque converter input speeds at which improved engine operating efficiency would otherwise most benefit the present invention.

Figure 7:
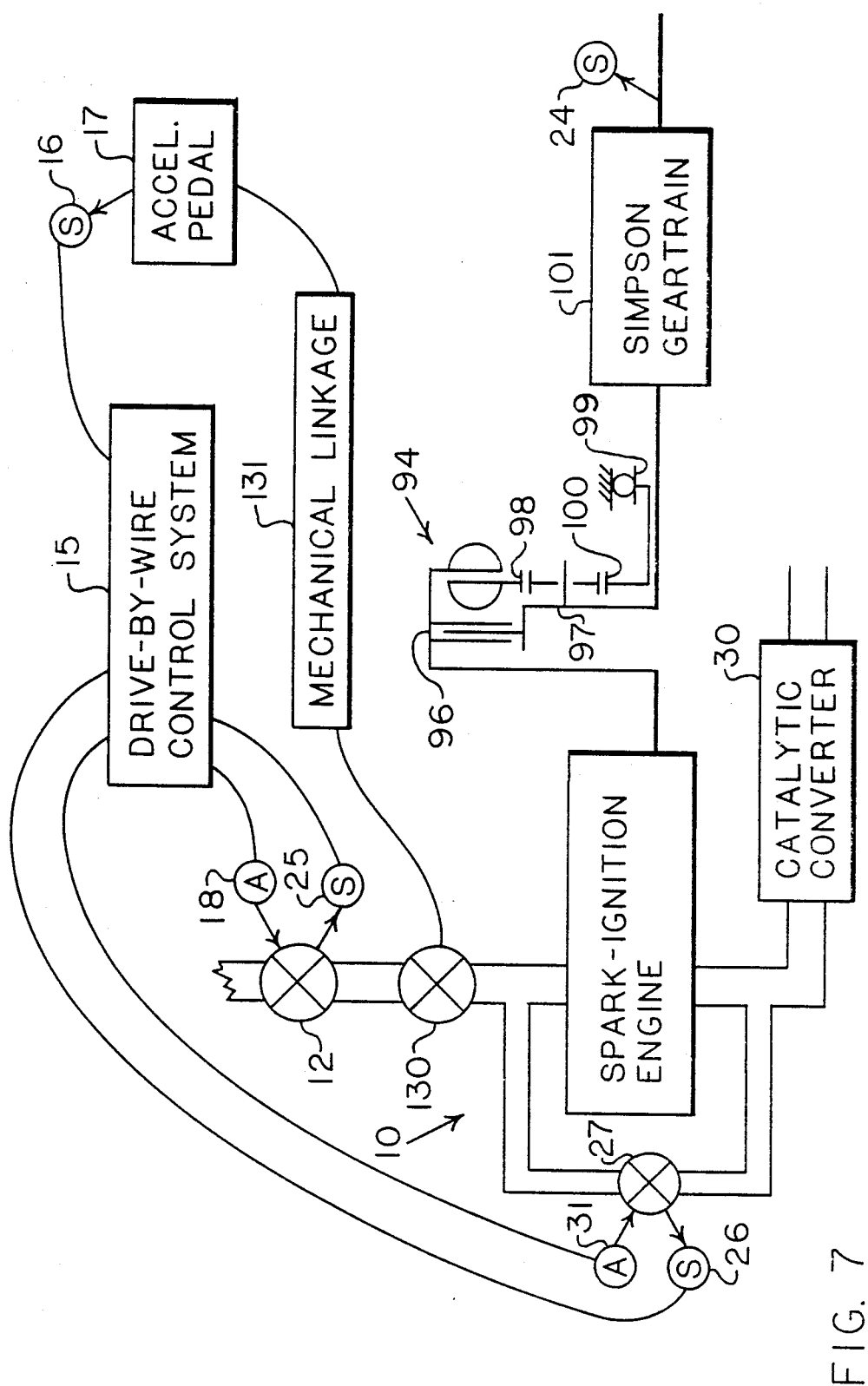
FIG. 7 shows an improved discrete-ratio transmission and a particular approach to drive-by-wire control, both for use in the present invention.

As a result of these shortcomings, the powertrain components of FIG. 1 utilize the fluid coupling assembly 21 in place of the usual torque converter, and the lockup clutch 35 of this coupling assembly 21 is engaged much earlier than is typical of the lockup clutch in a torque converter assembly. On the other hand, the 4-speed gearbox 23 must have wider gear ratio gaps if it is to duplicate the overall torque multiplication range of a 4-speed transmission with a torque converter. In reality, however, somewhat narrower ratio gaps are more appropriate in the absence of a torque converter because a torque converter helps bridge transmission ratio gaps. FIG. 7 shows one way of resolving this dilemma without resorting to unproven technology like that characteristic of continuously variable transmissions.

Just as a torque converter can provide torque multiplication, depending on whether its lockup clutch is engaged or released, so too can the modified fluid coupling assembly 94 because it has an integral planetary gearset. When the lockup clutch 96 is engaged, power passes directly to the planet carrier 97 of this integral gearset through a 1 to 1 ratio, but when the clutch 96 is released, hydrodynamic action detours engine power to the ring gear 98 before it reaches the planet carrier 97. In this torque multiplication mode, a roller cluch 99 prevents the sun gear 100 from turning backward, but it allows the sun 100 to turn forward at engine speed when the lockup cluch 96 is engaged. Unlike the torque multiplication of an unlocked torque converter, operation with the clutch 96 released neither allows as much slippage nor has nearly as much tendency to prevent high BMEP engine operation at low RPM.

This improved coupling assembly 94 drives a planetary geartrain 101 of the widely-used Simpson configuration, and this combination constitutes a transmission which is one alternative to the transmission shown in FIG. 1. Although the Simpson type geartrain has only three forward speed ratios, the first of these can have a value of 2.99 to 1 in conjunction with a value of 1.45 to 1 for the second forward speed ratio. Now using the coupling assembly 94 to split the first ratio gap and to provide a compound low gear ratio results in five nearly equally-spaced forward speed ratios with an overall ratio range of 4.33 to 1. In only the first and third of these five ratios is the lockup clutch 96 released. If the coupling 94 is used in conjunction with a 4-speed planetary geartrain, then only the first of 5 forward ratios will call for the lockup clutch 96 to be released. This improved fluid coupling assembly 94 exemplifies just one of many possibilities for improving discrete-ratio transmissions without resorting to risky and unproven technology. (Millions of Buick Dynaflow torque converters employed basically the same arranged of a built-in planetary gearset as shown for the coupling 94, but the similarity does not extend past the built-in gearset.)

Figure 8:
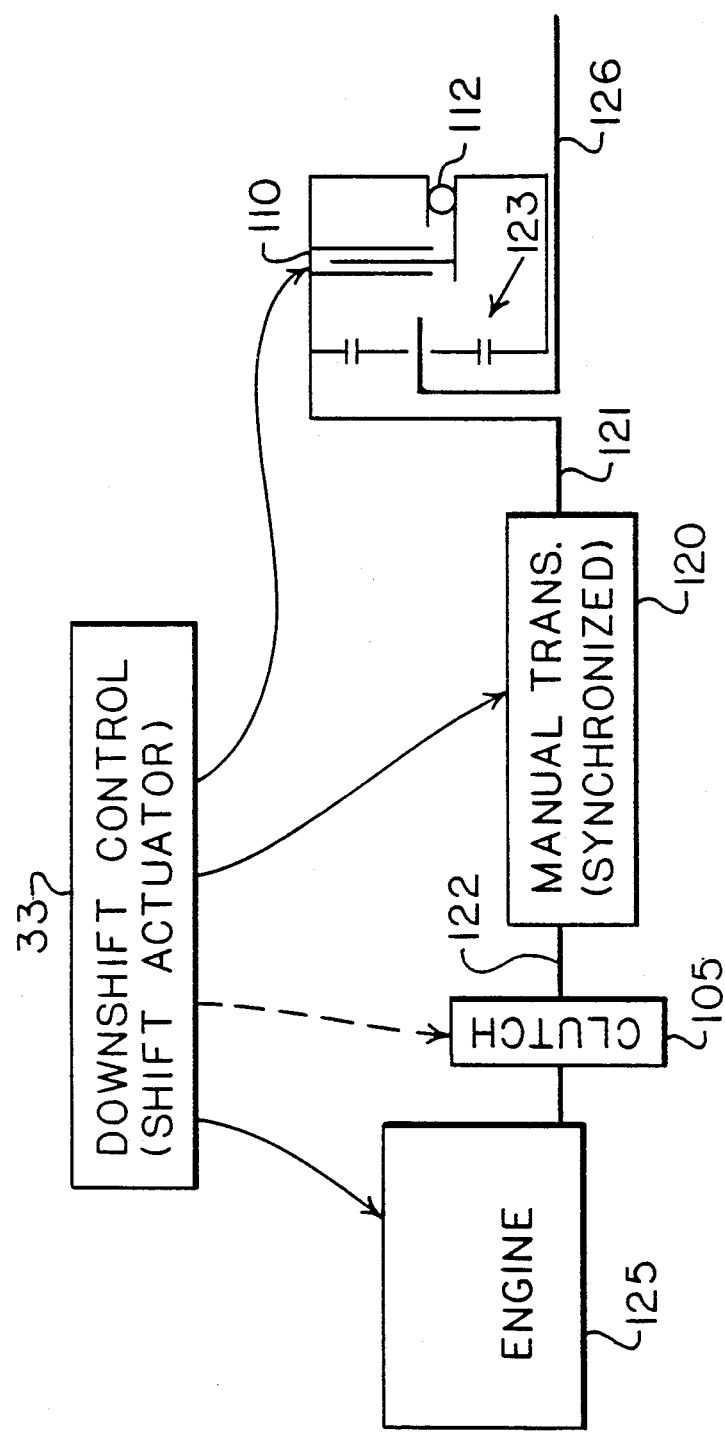
FIG. 8 shows another type of improved discrete-ratio transmission which can be used as part of the present invention.

FIG. 8 presents another example of improved discrete-ratio transmissions by showing how power-on downshifts can be extended to manual automotive transmissions equipped with synchronizers. The synchronizer-equipped transmission 120 in FIG. 8 follows current automotive practice in that it has a separate pair of gears devoted to each synchronized gear ratio and in that the output gear in each of these pairs can be coupled directly to the output shaft 121 of the transmission 120 through a jaw clutch which is part of a synchronizer assembly. In other words, the operating speed of all synchronized gears in the transmission 120 depends only on the speed of the input shaft 122 of the transmission 120. For the execution of upshifts, therefore, the frictional drag associated with all of these gears assists the transmission synchronizers, but for conventionally executed downshifts, the synchronizers must overcome the frictional drag in order to elevate the speed of the transmission input shaft 122. For this reason, the synchronizer downshift load increases as does the number of gear ratios included in the transmission 120, a fact especially significant for application to trucks.

Another way of elevating the speed of the transmission input shaft 122 relative to that of the output shaft 121 is to reduce the speed of the output shaft 121. This approach has two major advantages. First, frictional drag no longer opposes the synchronizers as it does during conventional downshifts, and second, the number of gear ratios in the transmission 120 has no real effect on synchronizer loading. Release of the auxiliary clutch 110 initiates this superior approach because the parallel roller clutch 112 is oriented to allow the sun gear in planetary gearset 123 to overspeed the ring gear when the transmission 120 is operating in a forward speed ratio.

The reduction in synchronizer load secured by allowing the speed of the transmission output shaft 121 to drop during downshifting shortens the time interval required to complete a downshift in the transmission 120, in addition to reducing synchronizer wear. Sufficiently quick downshifts can take place under full engine power, but in any case, no-load acceleration of the crankshaft of the engine 125 with the clutch 105 engaged brings the transmission 120 closer to the synchronous speed at which a downshift can be completed by engagement of the appropriate jaw clutch. As a result, the synchronizers in the transmission 120 will have to do even less work if power-on downshifts are not completed too quickly.

When the engine 125 is delivering power through one of the forward speed ratios of the transmission 120, the roller clutch 112 prevents the sun gear from turning relative to the ring gear in the planetary gearset 123, so that the auxiliary output shaft 126 is effectively locked to the transmission output shaft 121. The shift actuator 33 can therefore release the auxiliary clutch 110 without there being any immediate effect. As the second step in the downshift sequence, the actuator 33 briefly interrupts fuel injection to the Diesel or Otto engine 125 to facilitate disengagement of the active jaw clutch in the transmission 120. Immediately following is a no-load acceleration of the engine 125, during which the shift actuator 33 must complete engagement of the newly selected gear ratio in the transmission 120. Finally, the roller clutch 112 terminates the no-load acceleration of the engine 125 at the proper time, after which the auxiliary clutch 110 is re-engaged by the actuator 33.

The purpose of the planetary gearset 123 is purely to reduce the torque applied to the roller clutch 112 and especially the auxiliary clutch 110. Without this offsetting torque reduction, these clutches 110 and 112 would be exposed to torque levels many times greater than engine torque due to the torque multiplication created by the transmission 120. The planetary gearset 123 can have an inexpensive and relatively compact design because it experiences gearmesh action only briefly during the downshift sequence, and especially because it carries only parasitic torque loads when gearmesh action does occur. Consequently, the gearset 123 may employ spur gears supported in simple bushings. In addition, the gearset 123 should add as little as possible to the moment of inertia of the attached output shaft 121 even though acceleration of the input shaft 122 by the engine 125 can be the main contributor to synchronization within the transmission 120 during the downshift sequence.

Theory of Operation for Optimized Fuel Economy

Although the most fuel efficient operation of the engine 10 requires that its throttle valve 12 be effectively wide open, the reasons for this maximized efficiency can be conveniently explained by first considering part-throttle operation of the engine 10 at constant crankshaft speed. This explanation also requires the hypothetical modification of adding recirculated exhaust gas upstream, rather than downstream, of the throttle 12. In addition, the fuel injection system of the engine 10 is assumed to always operate in "closed loop" mode to thereby always inject fuel in stoichiometric proportion to the combustion air being consumed by the engine 10.

With both engine speed and a partly-open position of the throttle 12 now holding fixed values, the brake torque output of the engine 10 will depend only on its EGR rate. In contrast, engine frictional and air pumping losses will remain essentially independent of EGR rate, and indicated engine torque will equal the sum of a variable torque applied by the dynamometer brake plus a constant parasitic torque magnitude for the sum of engine friction and pumping losses. Since fuel must be consumed to overcome both of these components of indicated torque, higher brake torque reduces the percentage of fuel being consumed to overcome the constant parasitic component of indicated torque. So the mechanical efficiency of the engine 10 will be greatest when EGR reaches zero. On the other hand, EGR dilution of the fuel-air mixture reduces engine combustion temperature to thereby enhance three of the four major aspects of thermal efficiency of the engine 10. The best compromise between engine mechanical losses and engine thermal losses is therefore manifested in the EGR rate which minimizes BSFC. It is emphasized that this BSFC is minimum for the original fixed values of throttle position and crankshaft speed, but not minimum for the combination of the resulting rate of fuel flow to the engine and the original fixed crankshaft speed.

Like a reduction in EGR rate, a throttle opening greater than the original fixed value can reduce engine mechanical losses by allowing an increase in brake torque output. But unlike a reduction in EGR rate, a larger throttle opening need not increase combustion temperature in order to increase brake torque. (Heat transferred to the engine cooling jackets best exemplifies the degradation of engine thermal efficiency that accompanies an increase in combustion temperature.) As a direct consequence, a better compromise between engine mechanical losses and engine thermal losses can be obtained at the larger throttle opening. Going now to the logical conclusion, the minimum BSFC of the engine 10 at a particular crankshaft speed requires that the throttle 12 be effectively wide open. Furthermore, the preceding considerations are independent of engine crankshaft speed, with the result that the engine 10 can return quite low BSFC values throughout a broad power range provided that (1) the throttle 12 is always effectively wide open, (2) MBT spark timing is continually maintained over most of the engine speed range and (3) the EGR rate follows its schedule for optimum wide-open-throttle engine efficiency. In addition, the preceding considerations also apply to alternative intake charge dilutants, for example, the excess air of lean combustion.

Only a continuously variable transmission (CVT) could accurately follow a predominantly wide-open-throttle (WOT) engine operating schedule to thereby take full advantage of operating the engine 10 at WOT with its EGR rate optimized for fuel economy. On the broad WOT portion of the engine operating schedule, the CVT would provide primary control of engine power output. Which is to say that only a small excess of power in comparison to the value currently commanded via the accelerator pedal would initiate a correspondingly small increment of upshift of the CVT, and only a small debit in power would initiate an increment of downshift. If exactly this same control approach were used with the discrete-ratio gearbox 23, then the original gear shift would of course grossly overcompensate for the original, small error in power. A totally unacceptable oscillation between upshifting and downshifting would ensue, and such oscillation would be extremely prevalent.

The drive-by-wire control components of FIG. 6 can be viewed as actually following the same control approach that would be used with a CVT, but with hysteresis added to avoid oscillating shifting. Thus, the powertrain components of FIG. 1 operate to approximate the CVT engine operating schedule for the engine 10 as closely as is allowed by the gear ratios available in the gearbox 23.

FIG. 5 is in this sense a representation of the shift schedule hysteresis necessary to exclude all oscillating shifting of the gearbox 23 which would otherwise occur spontaneously at constant values of speed and road load of the associated passenger car. Nevertheless, this is not the usual definition of hysteresis as applied to a conventional shift schedule of discrete transmission ratios mapped onto the area of engine throttle position versus transmission output shaft RPM. Even though FIG. 5 does use commanded power output in place of throttle position, the usual definition of hysteresis will be used hereafter. Which is now to say that the shift map of FIG. 5 has no hysteresis because, for instance, the area 55 allocated to 1st gear does not overlap the area 56 allocated to 2nd gear. From a slightly different viewpoint, the single shift line 50 in FIG. 5 actually comprises both the 1st-gear-to-2nd-gear upshift line and the 2nd-gear-to-1st-gear downshift line. With hysteresis, the shift line 50 would separate into distinct upshift and downshift lines, but the upshift line must be on the right-hand side in FIG. 5 of its corresponding downshift line. Although FIG. 5 includes no hysteresis, a very modest amount will usually enhance performance of the control system components of FIG. 6 because, as just one example, the increased vehicle speed resulting from a downshift can almost immediately require the offsetting upshift.

Continuing now with the concepts of shift map hysteresis and of a predominantly WOT engine operating schedule of minimum brake specific cost, the transmission shift data of FIG. 5 can easily be transferred to the more conventional area of engine throttle position versus transmission output RPM by consulting the engine data exemplified by FIG. 2. Any particular point on the shift map of FIG. 5 determines a crankshaft speed which is simply the product of the transmission output RPM associated with the point and the speed reduction ratio of the transmission gear which maps to the point. The engine data exemplified by FIG. 2 then yield a corresponding throttle position when entered at this crankshaft speed and at the value of power output equal to the magnitude of commanded power taken from the particular point on the shift map of FIG. 5. When this procedure is repeated over a suitably large array of representative points covering the entire shift map of FIG. 5, a conventional shift map will result. The purpose of thus transferring the shift map of FIG. 5 is to inquire whether the conventional approach to transmission shift scheduling, including the use of a conventional engine throttle linkage, will produce good results in the case of an engine having a predominantly WOT operating schedule of minimum brake specific cost. Before making this inquiry, though, a few more facts will be needed.

As already noted, the shift map of FIG. 5 has no hysteresis, or overlapping of the areas allocated to different transmission ratios. Any such overlapping places engine performance at risk because, in general, only one of the gear ratios in the gearbox 23 can be best for a given combination of a particular power output and a particular vehicle speed. In the situation opposite to hysteresis, an upshift line in FIG. 5 diverges from its corresponding downshift line such that the area between them is not allocated to any of the available gear ratios. If the driver or cruise control system in the associated passenger car attempts to obtain a power level within one of these vacant areas, then oscillating shifting will ensue between the two gear ratios which bound the vacant area. This oscillating shifting is not spontaneous because it results from accelerator pedal movements made in search of an unavailable power level, for example the power level required to just maintain a desired vehicle cruising speed on an upgrade.

Hysteresis and vacant areas on a conventional shift map of engine throttle position versus transmission output RPM do not have the same effects just explained for FIG. 5. This difference arises from the fact that a gearshift executed without any accompanying change in engine throttle position will almost always cause a significant change in engine power output. When a conventional throttle linkage and a conventional shift map are used together, the driver must therefore adjust the accelerator pedal position if he is to eliminate changes in engine power output caused by gearshifts. Without hysteresis, however, the adjustment in pedal position will result simply in the offsetting gearshift back to the original side of the gap in availability of power output. Which is to say that the shift map of FIG. 5 will actually acquire hysteresis upon being transferred to a conventional shift map, and this acquired hysteresis gives the answer to the original question concerning how compatible conventional gearshift scheduling is with the best available approximation of a predominantly WOT engine operating schedule.

As suggested by the foregoing facts, a good way to construct a conventional shift map which neither sacrifices fuel economy nor engenders oscillating shifting is to first construct a preliminary shift map using the procedures that have been explained with reference to FIG. 5. (In the case of engine operation with an unlocked torque converter, the operating speed of the torque converter output shaft is used in place of engine crankshaft speed and engine throttle position is retrieved from engine-converter data.) Next, the preliminary shift map is transferred to the area of engine throttle position versus transmission output RPM. During this transfer, the shift map will acquire hysteresis in an amount which depends on the shape of the curve of throttle positon versus engine speed as determined by the engine operating schedule of minumum brake specific cost.

When the schedule of minimum brake specific cost is a predominantly WOT engine operating schedule, WOT will be needed throughout a range of crankshaft speed which begins at a rather moderate value. For example, the dashed line 130 in FIG. 5 defines a constant speed of the associated passenger car, and since this constant vehicle speed has a moderately high value, even the use of 4th gear will include WOT engine operation at the point 132 in FIG. 5. At the opposite extreme, point 131 will require closed throttle engine operation, and thus the 4th gear portion of line 130 by itself encompasses the full range of engine throttle positions. Moving now from point 132 just across the shift line 52 to point 133, commanded power output remains essentially unchanged while engine speed jumps to its 3rd gear value for the original, constant vehicle speed represented by dashed line 130. Consequently, point 133 requires enough throttling to reduce engine torque by the same factor by which the downshift to 3rd gear has increased crankshaft speed. Nonetheless, the point 134 at the top of the 3rd gear section of line 130 again requires WOT engine operation. Therefore the entire range of 3rd gear throttle positions from points 133 to 134 is contained within the range of throttle positions for the 4th gear portion of line 130. Similarly, the 2nd gear portion of line 130 from part-throttle point 135 to WOT point 136 fits within the range of throttle positions of the 3rd and 4th gear portions of line 130.

As is now clear from the constant vehicle speed line 130 in FIG. 5, non-overlapping ranges of travel of the accelerator pedal 17 in the present invention establish strongly overlapping ranges of engine throttle position. This repeating of a range of throttle position as the accelerator pedal is further depressed is, however, not practical using only a conventional throttle linkage to connect the accelerator pedal to the engine throttle. (Not only must the throttle repeat ranges of position as the accelerator pedal is further depressed, but it must appropriately vary these overlapping ranges of position as a function of vehicle speed.) Instead, extensive hysteresis appears on the conventional shift map of throttle position versus transmission output RPM. In fact, overlapping ranges of throttle position for using different transmission gear ratios at the same vehicle speed are one and the same as hysteresis on a conventional shift map.

But how extensive must hysteresis be before it becomes unacceptable? One important factor is that the extreme amount of hysteresis created by transferring the shift map of FIG. 5 to a conventional shift map is manifested entirely in delayed upshifts, or equivalently, the hysteresis may be said to be entirely on the upshift side. Even normal hysteresis on the upshift side is considered to be so objectionable that the established practice for production passenger cars is to place all hysteresis on the downshift side, even though this practice does introduce gaps in the availability of power output. Such gaps occupy only the upper levels of the engine's power availability in the case of current production cars, but in the case of using a discrete-ratio transmission to approximate a predominantly WOT engine operating schedule, the power gaps dip into quite low power levels when hysteresis intrudes into the downshift side. As an illustration, the engine operating schedule of minimum brake specific cost can easily require that the engine 10 produce as little as 20% of its maximum power capability, or even less, at WOT. Power gaps will appear at these low power levels unless hysteresis is restricted to the upshift side. In conclusion, using a discrete-ratio transmission to approximate a predominantly WOT engine operating schedule totally lacks compatibility with the type of throttle linkage and transmission shift map employed in conventional passenger cars.

A question still remains as to how conventional shift scheduling at the same time avoids both hysteresis on the upshift side and power gaps which dip into the most used levels of engine power output. The answer requires first the assumption of an engine operating schedule in which engine throttle opening increases more or less uniformly, not to reach WOT before the crankshaft speed of maximum power output. Since in FIG. 5 the uppermost 4th gear powertrain operating point 132 on line 130 takes place at relatively low crankshaft speed, it can no longer be anywhere close to WOT due to the roughly constant slope of throttle opening versus crankshaft speed as now being assumed. Because 3rd gear establishes a higher engine speed on line 130, the uppermost point 134 for 3rd gear operation on line 130 will have a much larger throttle opening than 4th gear point 132, but only the 2nd gear point 136 will remain at WOT. As a consequence of these changes, the three portions of line 130 will no longer have ranges of engine throttle position which overlap each other to such a large extent. Furthermore, for example, the fact that point 132 is now far removed from WOT means that a cushion in power output is available between point 132 and engine operation under the same conditions except for increased throttle opening. With the addition of hysteresis to the conventional shift map on the downshift side, the driver can utilize this cushion in power output—by further opening the throttle without a downshift back to 3rd gear—to close the power gap caused by an upshift from 3rd to 4th gear. If a predominantly WOT engine operating schedule is being approximated, then there is absolutely no cushion available to close the power gaps resulting from the addition of hysteresis to the downshift side of a shift map of throttle position versus vehicle speed. Even if a cushion is available to close power gaps, a downshift detent must be employed at the extreme of accelerator pedal travel to accomodate hysteresis on the downshift side. Although such a downshift detent is widely used in current passenger cars, its use conflicts with the EGR interrupt device 94 already described with reference to FIG. 6.

Another consideration using the line 130 of constant vehicle speed in FIG. 5 further explains why a predominantly WOT schedule presents basically conventional shift maps with such difficulty. As already noted, the entire range of engine throttle positions contained in the 2nd gear portion of line 130 from part-throttle point 135 to WOT point 136 is also contained within the 3rd and 4th gear portions of line 130. Since the throttle opening at point 135 is obviously much greater than the idle throttle opening at point 131, there will be a point 135" which has the exact same throttle opening as point 135, but which is located on the 4th gear portion of line 130. In other words, the 4th gear line segment 137 from point 135" up to point 132 will encompass exactly the same range of engine throttle positions as does the 2nd gear segment 139 extending between points 135 and 136. Similarly, point 135' has the same throttle opening as point 135 and begins another segment 138 encompassing a range of throttle positions identical to that of segments 137 and 139.

Although the line segments 137 and 139 cover exactly the same range of engine throttle position, they result in quite disparate ranges of engine power output due to different engine speeds. Accordingly, the present invention relegates the moderate power output of segment 137 to moderate travel of the accelerator pedal 17, while the high power output of segment 139 appropriately occupies the most extreme range of travel of the pedal 17, but again, both of segments 137 and 139 use the same range of throttle position. In contrast, a conventional throttle linkage must place these widely differing ranges of power output in the same range of accelerator pedal travel. Using the conventional linkage and enough hysteresis to prevent unacceptable power gaps, the vehicle operator must momentarily release the accelerator pedal the right amount to initiate upshifts from segment 139 into segments 138 and 137, or momentarily floor the pedal even to initiate a downshift from the moderately low power of segment 137 to the only moderately high power of segment 138. Clearly, adding a separate device to help control upshifts and downshifts would improve this situation. Just as clearly, such an added control device is not acceptable to the majority of purchasers of new cars equipped with automatic transmissions, and it verifies the fact that hysteresis on a conventional shift map constitutes an undesirable decoupling of the accelerator pedal from the engine speed control provided by gearshifts. Moreover, it is now evident that hysteresis should be considered as acceptable only if the associated delays in transmission upshifting are acceptable when the associated vehicle is accelerating without any attendant movement of its accelerator pedal.

To take yet another viewpoint, the driver uses the accelerator pedal as an engine power-controlling device, but the throttle valve of an Otto engine or especially the fuel injection rack of a Diesel engine is primarily an engine torque-controlling device. Now using the Diesel engine as an example, minimum BSFC usually dictates a schedule of position of the injection rack which first rises abruptly as a function of crankshaft speed and then remains nearly fixed over a broad range of RPM. Since the nearly fixed position of the injection rack can correspond to any one of a wide selection of crankshaft speeds, the desired power output cannot always be inferred from the position of the injection rack. If, on the other hand, the operating schedule is modified so that injection rack position changes uniformly with crankshaft speed, then desired crankshaft speed, and thus also power output, can easily be inferred from rack position.

In theory, only a small slope on the operating schedule of injection rack position versus engine RPM will allow the desired engine speed to be determined from rack position, and in addition, desired engine speed can always be inferred from the position of an accelerator pedal which continues to move after establishing a fixed injection rack position. Nonetheless, this alone will not solve the problem because a discrete-ratio transmission introduces errors in the desired engine operating speed as compared to operation with a wide-ratio CVT. These engine speed errors in turn require torque modulation using the injection rack, and the driver cannot successfully use the accelerator pedal to modulate torque unless the pedal is selectively decoupled from engine speed control via hysteresis. An engine operating schedule which always maintains a significant slope of increase in injection rack position versus increase in engine speed will still necessitate hysteresis on a conventional shift map, but acceleration of the associated vehicle will inherently cross through this hysteresis without causing such unacceptable delays in the initiation of gearshifts. (It is interesting to note an advantage the Otto engine has in comparison to the Diesel engine. This advantage originates in the inherent decrease in torque output which an Otto engine experiences as its crankshaft speed increases at a fixed partly-open position of its throttle valve. In contrast, Diesel engine torque output remains much more nearly independent of crankshaft speed at a fixed position of its injector rack. Owing to this difference, an acceptable level of hysteresis on a conventional shift map will allow an Otto engine to utilize a greater percentage of its maximum BMEP in the middle portion of its crankshaft speed of maximum power output. Counteracting this advantage is the Diesel engine's superior efficiency at reduced BMEP levels.)

As just implied, the orientation of an area of hysteresis on a conventional transmission shift map can have importance equal to that of the size of the area. In this respect, it is intersecting to note yet another way of viewing the present invention. First, non-drive-by-wire operation of the specially calibrated engine 10 to achieve minimum BSFC would preclude using hysteresis on the downshift side of a conventional shift map (of engine throttle position versus vehicle speed) because the resulting power gaps would intrude into much lower levels of engine power output than they do in an entirely conventional passenger car. Moving the hysteresis to the upshift side would close these unacceptable power gaps and at the same time eliminate all conflict between an accelerator pedal downshift detent and an EGR interrupt device such as the device 94. Even so, the resulting upshift hysteresis would be quite extensive and have an orientation such that vehicle acceleration at a fixed accelerator pedal position would often be accompanied by grossly delayed upsfhits.

In other words, a previously explained technique can be used to generate a basically conventional shift map of engine throttle position versus vehicle speed by transferring data from the unconventional shift map of FIG. 5. Such a basically conventional shift map would include areas of upshift hysteresis so wide that the horizontal line traced across the shift map by vehicle acceleration at a fixed throttle position would often remain entirely within the area of hysteresis. This obviously accounts for the extreme delays in upshifts. In contrast, drive-by-wire throttle control as described herein inherently closes the engine throttle during vehicle acceleration, even at a fixed position of the accelerator pedal 17. This deviation from a horizontal line across the shift map would in fact eliminate all delay of upshifts, but it is much more practical to use the shift may of FIG. 5 directly with no transfer from the area of commanded power versus vehicle speed.

The foregoing considerations all relate to the principal question of how closely a chosen engine operating schedule can be approximated using a given selection of discrete transmission gear ratios. The obvious conclusion to be drawn from these considerations is that drive-by-wire control does allow a closer approximation in comparison to the approach currently being used in production passenger cars. Nearly as evident is the fact that the extent of the improvement depends on engine calibration. In the case of Otto cycle engines, drive-by-wire control becomes more beneficial as engine calibration becomes more refined in terms of reduced brake specific fuel consumption. Thus, a kind of synergism exists for the combination of drive-by-wire control with the specially-calibrated engine 10 and the wide-ratio powershift gearbox 23.

Another interesting conclusion is that the extent of the improvement offered by drive-by-wire control diminishes as does the average gap between consecutive ratios in the given selection of discrete transmission ratios. So while drive-by-wire control is more often associated with futuristic CVT's, it is actually more essential in the case of discrete-ratio transmissions.

Possibly the most important conclusion concerns the theoretical improvement in fuel economy that would be made possible by replacing a conventionally-calibrated engine with the specially-calibrated engine 10 and at the same time employing a perfect CVT. A major portion of this theoretical improvement could be secured without using a CVT at all, that is, by using drive-by-wire control together with the engine 10 and the discrete-ratio gearbox 23. Drive-by-wire control offers its benefit with virtually no attendant technological risk, but the same is clearly untrue for automotive CVT's that can be used in larger cars.

Beyond theoretical improvements are practical considerations such as the fact that CVT's are now in very limited production with their use being restricted to very small cars which already achieve high fuel economy. The fuel economy of larger, more powerful cars is currently the real issue, and it is for these cars that a practical CVT is more doubtful and in these cars that 4-speed powershift gearboxes are for the most part standard equipment.

Some practical considerations even question whether the CVT has any real-world fuel economy advantage over what can be achieved with discrete-ratio transmissions. One such consideration is that CVT's are unlikely to duplicate the power transmission efficiency available with improved discrete-ratio transmissions. Another is the inability of production CVT's to downshift quickly; acceptable response for acceleration may dictate an engine torque reserve which offsets much of the theoretical advantage of CVT's.

To this point, the discussion of transmission shift scheduling has assumed that every adjustment in the torque output of an Otto cycle engine requires a change in engine throttle position. On the contrary, the engine calibration procedures that were explained with reference to FIG. 2 will usually result in engine torque at least occasionally being adjusted purely through change in position of the EGR valve 27, without any concurrent deviation from an effectively wide open position of the throttle 12. Stated differently, the EGR dilution rate may vary even when crankshaft speed and throttle position both remain unchanged.

As just noted, the EGR rate for the preferred embodiment is not always a single-valued function of the variables of crankshaft speed and throttle position. But it is a single-valued function of crankshaft speed and accelerator pedal position. This conclusion follows from two facts. First, each point on the shift map of FIG. 5 has only a single corresponding EGR rate, and second, the scale of commanded power in FIG. 5 is equivalent to a scale of accelerator pedal position.

Since the positions of both of the throttle valve 12 and the EGR valve 27 are thus single-valued functions of the variables of accelerator pedal position and crankshaft speed, they must also be single-valued functions of accelerator pedal position and the output shaft RPM of the gearbox 23. Consequently these valve positions could be mapped onto the same area used in FIG. 5 for mapping transmission gear ratios. To use this variation of the present invention would further require the gearbox output speed signal from sensor 24 to replace the engine speed signal from sensor 20 as an input to the engine data storage unit 90 in FIG. 6. This variation often does entail more read-only-memory space in the engine data storage unit 90, but it has the advantage of immediately yielding the new throttle valve and EGR valve positions that will be needed after an impending gearshift (and the disadvantage of not allowing delay of gearshifts to reduce "shift busyness").

(Already mentioned is a variation of the present invention in which the combination of the engine and transmission to form a powertrain is dynamometer tested to yield data surfaces that are mapped onto a modified area of RPM and power. The modification for mapping is simply that RPM and power are measured at the output shaft of the transmission rather than at the output shaft of the engine or torque converter. Data surfaces are thus determined for each mode in which the powertrain is capable of operating, and brake specific cost of operating the engine and transmission together is the one of these data surfaces which provides a candidate value for comparison to the candidate values from the other powertrain operating modes. This comparison can be repeated on a continuous basis to select the operating mode of minimum brake specific cost in response to continuously updated values of accelerator pedal position and transmission output RPM, or it can be completed just once for each representative point to thereby generate the shift map of FIG. 5. Even though a somewhat different method was described for generating the FIG. 5 shift map in the case of the preferred embodiment, the results in both cases are essentially identical. In other words, the procedure already described for the preferred embodiment is simpler than the powertrain approach, but the powertrain approach has wider application and its broader principles still apply to the simpler cases. Moreover, the powertrain data surfaces can be synthesized from engine and torque converter dynamometer data without directly obtaining any powertrain data.

The data surfaces for one powertrain operating mode will never be identical to those for a different mode, but they will differ only by an RPM scaling factor if the overall efficiency of power transmission from the engine crankshaft to the gearbox output shaft is constant. This is in essence the case for the preferred embodiment, and it allows the engine data storage unit 90 to use the same set of throttle and EGR data for several powertrain operating modes. If, however, the overall efficiency of power transmission is siqnificantly different for every powertrain operating mode, then no such duplicate use of data is possible. It is this situation that is now of interest.

Just considered was another variation of the invention, one in which throttle and EGR valve positions are mapped onto the area of FIG. 5. This other variation requires no increase in read-only-memory space when no duplicate use of data is employed in controlling the engine throttle and EGR valves.)

Even if drive by-wire control is not utilized, the intake charge dilution rate will not necessarily be a single-valued function unless accelerator pedal position replaces throttle position as a mapping variable to be used along with crankshaft speed. As an example of this, a cam mechanism could be used to achieve WOT engine engine operation relatively early in accelerator pedal travel. High intake charge dilution would also be reached at this moderate position of the pedal, and further movement of the pedal would continue to increase engine torque output at WOT by commanding progressive reduction in the rate of intake charge dilution. The basic analysis using the constant vehicle speed line 130 in FIG. 5 can still be applied to this example.

First, an overall engine torque control means is defined to be the combination of the engine throttle valve with the air-fuel charge dilution rate because it is the status of this torque control means which controls engine torque output and which is varied by accelerator pedal position according to a chosen function. (When drive-by-wire control is utilized, the status of the engine torque control means can obviously change independently of accelerator pedal position.) Next, essentially the whole range of air-fuel dilution employed by this torque control means at WOT is assumed to be used at quite moderate engine speeds as well as at middle and upper engine speeds. This assumption clearly follows from the objective of minimizing engine fuel consumption, and it leads to the conclusion that the status of the torque control means passes through a sequence of heavily overlapping ranges in going along the full length of a constant vehicle speed line like the line 130 in FIG. 5. As already implied, this extensive overlapping is one and the same as hysteresis on a shift map of status of the torque control means (or equivalently, position of the accelerator pedal) versus vehicle speed. Due to the extent of overlapping, the hysteresis will also be excessive, with the result of an unacceptable decoupling of the accelerator pedal from the engine speed control provided by gearshifts. Postponing WOT engine operation until higher engine speed will reduce the hysteresis, but not without reducing fuel economy.

Another remaining question concerns whether the power gaps created by transmission gearshifts must be closed automatically, as in the present invention, or manually by adjustments the driver makes in accelerator pedal position. More specifically, this question asks whether automatic regulation of an engine torque-controlling device to thereby close gearshift power gaps is absolutely necessary for achieving a good approximation of a predominantly WOT engine operating schedule when using a selection of normally-spaced discrete transmission gear ratios. The following description of an alternative approach answers this question.

The underlying premise of this alternative approach is that power gaps can be quite acceptable during acceleration of the associated vehicle, and established practice does leave little doubt about this premise. Therefore a primary shift map can dispense with hystersis in mapping discrete transmission ratios onto the area of accelerator pedal position versus transmission output RPM. Also basically conventional in this approach is an engine throttle linkage which utilizes a simple mechanical cam system both to secure WOT engine operation fairly early in accelerator pedal travel and t maintain WOT engine operation throughout the remainder of pedal travel. Movement of the accelerator pedal does not change the EGR or other fuel-air dilution rate in the WOT area of the primary shift map.

Each shift line on the primary shift map includes a powertrain operating point located by full accelerator pedal travel and by the transmission output RPM established when the engine is operating at its crankshaft speed of maximum power output while using the transmission ratio immediately to the left of the shift line. Each shift line joins this point at the top of the primary shift map to a point at the bottom located by complete release of the accelerator pedal and by engine idle speed while using the transmission ratio immediately to the right of the shift line in question. Also included on each shift line is an intermediate point located by the extent of accelerator pedal travel to first secure WOT and the transmission output RPM established using the lowest WOT engine speed on the engine operating schedule in combination with the transmission ratio immediately to the right of the shift line. A straight line can always be used to form the upper portion of a shift line between its intermediate and upper points without causing deviation from the WOT portion of a predominantly WOT engine operating schedule. Using a straight line segment for the part-throttle portion of the shift line, in contrast, requires a particular relationship between accelerator pedal travel and engine throttle opening, but the shift lines need not be straight. In any case, the righthand edge of the part-throttle segment of each shift line establishes the part-throttle portion of the engine operating schedule.

As a direct consequence of using this primary shift map with the cam-actuated throttle already mentioned, the driver can conveniently select WOT upshifts and downshifts from throughout a broad choice of engine speed. It is quite unlikely, however, that WOT engine operation in any of the available transmission ratios would provide the power output needed once the driver reaches his desired cruising speed, not even to mention the continuously varying effect of headwinds and inclination of the roadway. Since at least one unacceptable upshift will occur if the driver returns the accelerator pedal to the part-throttle portion of the primary shift map, some type of hysteresis must be added to the arrangement as described so far.

This hystersis entails, first, placing an auxiliary throttle valve in series with the main, cam-actuated throttle valve so that engine torque can be modulated by throttling when the accelerator pedal is partially released, but still remains well within the WOT portion of the primary shift map. In other words, the position of this remotely-actuated, auxiliary throttle should rapidly increase toward WOT whenever accelerator pedal travel increases, and it should rapidly decrease from WOT whenever pedal travel decreases; the minimum opening of the auxiliary throttle far exceeds the idle opening of the main throttle.

Next, the accelerator pedal position used to consult the primary shift map should in certain instances deviate from the actual pedal position. One of these instances is that the original pedal position at the beginning of a release should still be used until either a gearshift occurs or the auxiliary throttle is returned to WOT by the accelerator pedal. A gearshift should also reset the auxiliary throttle to WOT. Finally, some means must be added to limit the amount by which this hysteresis reduces engine BMEP.

A shift map like FIG. 5 will indicate the appropriate transmission ratio for enforcing such a BMEP limit if the map is entered at the existing rather than commanded value of power output. Existing power can be determined using measured values of engine speed and auxiliary throttle postion to consult the engine data exemplified by FIG. 2. (A simpler alternative also uses the determination of existing power output, but it is applicable only when the fuel-air dilution rate is a single-valued function of engine speed and throttle postion. In the case of such a single-valued function, the engine operating schedule yields the minimum crankshaft speed necessary to develop the existing power output, and the optimum one of the available transmission ratios will meet this minimum speed requirement with less excess speed than will any other of the available ratios. This alternative to the shift map of FIG. 5 also applies when the power gaps created by gearshifts are eliminated automatically, but the required single-valued function usually necessitates some loss in fuel economy.)

Another instance of not using the existing accelerator pedal position to consult the primary shift map occurs when an upshift is initiated, in consideration of engine BMEP, before it is indicated by the primary shift map. A correction is added to accelerator pedal position to prevent the offsetting downshift until such time as the correction makes no difference in the optimum gear ratio as determined using the primary shift map.

The foregoing arrangement of modified components, unlike the preferred embodiment, forces the driver of the associated passenger car to manually offset some of the changes in power output caused by transmission gearshifts. But like the preferred embodiment, it both requires continuous access to the engine data exemplified by FIG. 2 and establishes a range of engine throttle postion which is repeated at non-overlapping ranges of accelerator pedal postion. Although this arrangement does relinquish automatic closing of power gaps, it certainly does not offer any advantage in reduced complexity. (The extra complexity of having two engine throttle values in series provides an added safety benefit for the preferred embodiment as well as for the modified arrangement just considered. As shown in FIG. 7, the original throttle valve 12 would function as the auxiliary throttle because it is remotely controlled by the control system 15 in accordance with the engine data exemplified by FIG. 2. In the event of failure of the actuator 18 to close the throttle 12, the throttle 130 in series with the throttle 12 would still be positively linked to the accelerator pedal 17 through the mechanical linkage 131. This linkage 131 would incorporate a simple cam mechanism to move the throttle 130 along the outer envelope of throttle position required by FIG. 5 in conjunction with the relationship selected between commanded power and position of the pedal 17. A given position of the pedal 17 determines a single vertical height on the shift map of FIG. 5, at which the largest throttle openings occur immediately on the righthand side of the shift lines 50, 51 and 52. The greatest of these throttle openings is established at the throttle valve 130 by the mechanical linkage 131, but the engine data exemplified by FIG. 2 must now be corrected to account for the extra flow resistance of having two throttle valves. As an alternative to correcting the engine data, the linkage 131 can keep the throttle 130 well beyond the outer envelope of throttle position.

Assuming that a main, mechanically-controlled throttle valve 130 is added in series with the remotely-controlled throttle 12 to define the outer envelope of throttle positions, then the throttle 12 no longer serves any purpose beyond closing the power gaps that result from gearshifts. The fact that the EGR valve 27 helps serve the same purpose suggests that a drive-by-wire throttle might not be necessary for what in effect remains drive-by-wire control. The engine torque modulation range available using only the EGR valve 27 will not always be sufficiently wide, but a strategy of not necessarily closing the normally wider power gap at the first upshift after accelerating from a stop will augment this approach. Of more direct benefit is the fact that the EGR valve 27 can alone be used to modulate engine torque even if that involves a sacrifice in fuel economy as compared to using throttling and EGR in combination.

At lighter throttle settings, an EGR valve would be even less likely to provide an acceptably wide range of engine torque modulation. However due to the steep slope of change in throttle postion versus change in crankshaft speed, hysteresis can be successfully utilized under part-throttle conditions to compensate for the lack of an actual drive-by-wire control system for the engine throttle. If a shift map like FIG. 5 is constructed without benefit of a drive-by-wire throttle control, then what is in effect drive-by-wire EGR control will likely fail in certain areas of the shift map to provide the commanded power output, regardless of which transmission ratio is chosen. These initally unassigned areas will separate areas assigned at low levels of commanded power to adjacent transmission gear ratios. The required hysteresis is obtained simply by assigning both of the adjacent transmission ratios to any initally unassigned area, but doing so will mean that adjustment in accelerator pedal position will sometimes be necessary to bridge the power gaps opened by gearshifts.

While the drive-by-wire throttle 12 could thus actually be eliminated by using sufficiently narrow gear ratio gaps and other means, the EGR valve 27 would continue to function as the engine torque-controlling device which automatically closes most of the power gaps caused by gearshifts, without any concurrent need for the driver to move the accelerator pedal. To go even further, the excess air of lean combustion could replace the EGR which eliminated the drive-by-wire throttle in the variation just being considered. This last variation, two steps removed from the preferred embodiment, would have neither a remotely-controlled throttle valve nor an EGR valve, but the control system 15 would now modulate engine torque at WOT only by appropriately varying fuel injection pulse width. This torque modulation would have a very fast response time, for example allowing engine torque to be quickly adjusted upward immediately following the completion of an upshift. One disadvantage of this lean-burn variation, though, is that throttling would not be available to close gearshift power gaps which occur when dilution of the fuel-air mixture is much more limited during cold engine operation. In this regard, the preferred embodiment could go so far as to use only throttling, with zero EGR, during cold engine operation, but this approach would necessitate an extra set of engine data in the engine data storage and control unit 90 of FIG. 6.

Returning now to part-throttle operation of the engine 10 with EGR added upstream of the throttle 12 and with crankshaft speed being fixed, a question arises with regard to minimum BSFC at constant throttle opening versus minimum BSFC at constant fuel injection pulse width. Beginning with constant throttle opening, an increment of EGR added at the minimum BSFC will reduce combustion temperature, but at the expense of engine mechanical efficiency. Since the curve of BSFC versus EGR rate is nearly horizontal in the vicinity of the minimum BSFC, the reduction in combustion temperature must improve engine thermal efficiency by more than the reduction in burn rate, due to added EGR, degrades thermal efficiency. (Lower combustion temperature reduces heat losses to mainly: (1) the cylinder head surfaces and other surfaces which are in contact with the hot, expanding combustion gases, (2) non-translational molecular energy states activated at higher temperatures of the combustion gases, and (3) molecular dissociation of the combustion gases. In contrast, reduced burn rate lowers the average effective compression ratio at which heat is added to the combustion gases.) The overall improvement in thermal efficiency can, however, be secured without any offsetting degradation of engine mechanical efficiency. This superior approach requires that brake torque not decrease, or in other words, that the increment of added EGR be obtained with no decrease in injection pulse width. This is of course the second of the two original alternatives for minimizing BSFC, but only the less effective of the two is available once the engine 10 has reached an effectively-wide-open position of its throttle 12.

It is now clear that the part-throttle calibration technique for the engine 10 pits burn rate against the three benefits of reduced combustion temperature in combination with a very slight reduction of air pumping loss. An alternative part-throttle calibration technique is obviously somewhat less efficient because it is closely related to the less desirable of the two BSFC minimization techniques that have just been considered. More specifically, the position of the EGR valve would still be varied in search of minimum BSFC, but with a concurrent change in pulse width and no concurrent change in throttle position. This variation would allow both spark timing and the schedule of EGR valve position to be determined as functions of throttle position and crankshaft speed.

Another variation of the present invention again relates to the two part-throttle BSFC minimization techniques. The naturally-aspirated engine 10 could probably, like the supercharged engine 51, utilize a higher compression ratio if the wide-open-throttle schedule of fuel injection pulse width were limited by the constant pulse width values for which BSFC is exactly minimized as the throttle 12 first reaches an effectively wide open position. Nevertheless, any resulting increase in compression ratio is balanced against disadvantages associated with the greater piston displacement needed to offset the considerable attendant loss in brake torque. (The EGR interrupt device 94 in FIG. 6 would also have to be eliminated to allow a higher compression ratio.) In the case of naturally-aspirated engines, compression ratio usually is already high enough that not having to increase piston displacement is a much greater advantage. Moreover, the EGR interrupt device 94 is rarely practical on highly-boosted supercharged engines, so the penalty in piston displacement is not nearly as great.

In the following claims, the term "Otto cycle engine" has an established definition that is functional. In other words, any new device, no matter how different structurally from all previous types of Otto engines, will be classified as being an Otto engine if it meets the established requirements of function. This is clear from the wide structural diversity of Otto engines that exist already, as is illustrated by comparing conventional reciprocating engines to the Wankel rotary engine. More importantly, the scope of any patent claim encompassing an Otto engine as an element in a novel combination with other known elements would include the case of a new Otto engine invented after the issuance of the patent claim.

Unfortunately, there are no established functional definitions suitable for other major elements in the following claims. Accordingly, the following claims often make their own definitions by specifying what functions the named element is operative to perform. Novelty resides in the combination of elements, and within individual elements as well.

What is claimed is:

1. Apparatus for powering a vehicle, comprising: a naturally-aspirated Otto cycle engine having (1) a throttle valve device used to provide substantially all control of combustion air density for the engine, the Otto engine being of a type which, in order to prevent misfire, requires intake air throttling over at least a major range of brake torque produced at a power output shaft of the engine and (2) an intake mixture preparation system operative when said throttle valve device is at least effectively wide open to automatically use intake charge dilution to provide benefits of (a) reducing brake specific fuel consumption of the engine and (b) suppressing autoignition in the engine, said wide open throttle benefits being provided by said intake mixture preparation system over at least half of a range of operating speed of said engine output shaft required to satisfy all operating conditions of the vehicle, and a discrete-ratio gearbox which receives power from said engine power output shaft and which has a gearbox power output shaft that provides substantially all mechanical energy for powering the vehicle, substantially all of said mechanical energy for powering the vehicle being transferred from the engine to propel the vehicle without a significant time delay, whereby the technological risk of a CVT is avoided.

2. The apparatus of claim 1 further comprising means for eliminating said wide open throttle charge dilution only when an accelerator pedal of the vehicle is fully depressed, whereby full engine power is available without compromising fuel economy achieved when said accelerator pedal is less than fully depressed.

3. The apparatus of claim 1 further comprising (1) means operative to select and enable a gear ratio according to a mapping of gear ratios available in said gearbox onto an area of rotational speed of said gearbox power output shaft versus position of an accelerator pedal in response to which position said engine throttle valve device is adjusted, said mapping utilizing positions of said throttle valve device selected from wide open and effectively wide open to establish engine power levels extending upward from below one-third of the engine's maximum power level obtained with zero air-fuel charge dilution, said mapping having an acceptable amount of shift schedule hysteresis and at the same time allowing elimination of substantially all unacceptable gaps in powder available to propel the vehicle and (2) means operative to adjust said engine throttle valve device in response to said accelerator pedal position and in response to variations in an additional parameter, including adjustments of said throttle valve device in response to variations in said additional parameter which are accompanied by a fixed position of said accelerator pedal, said additional parameter being dependent upon variables selected from (1) operating speed of said engine power output shaft, (2) said engine brake torque, (3) said speed of said gearbox power output shaft and (4) brake torque provided by said gearbox output shaft, whereby said accelerator pedal commands gearshifting of said gearbox to thereby maintain acceptable control of said engine operating speed, but without causing unacceptable gaps in said power available to propel the vehicle.

4. The apparatus of claim 1 further comprising means which (1) selects and enables a gear ratio from gear ratios available in said gearbox, said ratio selection depending upon position of an accelerator pedal used to control power output from the engine, and which (2) establishes (a) a first range of position of said engine throttle valve device for operation of the engine using a first of said available gearbox ratios and (b) a second range of said throttle valve position for operation of the engine using a second of said available gearbox ratios, said first and said second ranges of throttle valve position strongly overlapping each other when operating speed of said gearbox output shaft holds a constant value, but said accelerator pedal establishing said first range of throttle valve position at said constant gearbox speed only when said pedal is advanced to a range of its position beyond that which establishes said second range of throttle valve position at said constant gearbox speed, said strong overlapping of throttle position ranges without corresponding overlapping of accelerator pedal position ranges existing throughout a broad range of operating speed of said gearbox power output shaft within which said first and said second ranges of throttle valve position are each changing and are each continuously bounded by a position of said throttle valve device that is selected from wide open and effectively wide open, whereby gaps in power available to propel the vehicle are reduced while said accelerator pedal still maintains acceptable control over gearshifts and thus over engine speed.

5. The apparatus of claim 3 further comprising means for eliminating said wide open throttle charge dilution only when an accelerator pedal of the vehicle is fully depressed, whereby full engine power is available without compromising fuel economy achieved when said accelerator pedal is less than fully depressed.

6. The apparatus of claim 4 further comprising means for eliminating said wide open throttle charge dilution only when an accelerator pedal of the vehicle is fully depressed, whereby full engine power is available without compromising fuel economy achieved when said accelerator pedal is less than fully depressed.

7. The apparatus of claim 1 further comprising (1) input means operative to command a varying desired level for power substantially as delivered from said gearbox output shaft to propel the vehicle, said commanded level of power having a discrete current value, and (2) throttle control means operative to adjust said engine throttle valve device to thereby substantially equalize current magnitude of said gearbox output shaft power to said current value of commanded power, said throttle control means being operative to adjust said throttle valve device to maintain said power equalization when operating speed of said engine power output shaft changes while said commanded power level remains constant, including changes in said engine operating speed that are caused by gearshifts in said gearbox, whereby said throttle control means automatically closes gaps in the availability of said gearbox output shaft power.

8. The apparatus of claim 7 wherein said input means comprises an accelerator pedal and wherein the apparatus further comprises (1) means operative to select and enable a gear ratio according to a mapping of gear ratios available in said gearbox onto an area of rotational speed of said gearbox power output shaft versus position of said accelerator pedal, said mapping utilizing positions of said engine throttle valve device selected from wide open and effectively wide open to establish engine power levels extending upward from below one-third of the engine's maximum power level obtained with zero air-fuel charge dilution, said mapping having an acceptable amount of shift schedule hysteresis and at the same time allowing elimination of substantially all significant gaps in power available to propel the vehicle, and (2) means for eliminating said wide open throttle charge dilution only when said accelerator pedal is fully depressed, whereby said wide open throttle charge dilution is inherently utilized to improve fuel economy of the vehicle and whereby full engine power is available without compromising fuel economy achieved when said accelerator pedal is less than fully depressed.

9. Apparatus for improving the efficiency with which mechanical power is produced by an Otto cycle engine and delivered to a load, the engine having a throttle valve device used to provide substantially all throttling of substantially all combustion air consumed by the engine to thereby provide control over at least a major range of brake torque produced at a power output shaft of the engine, the apparatus comprising:

an intake mixture preparation system for the engine operative to automatically use intake charge dilution to provide benefits of (1) reducing brake specific fuel consumption of the engine and (2) suppressing autoignition in the engine when density of combustion air consumed by the engine is substantially maximized with the throttle valve device being at least effectively wide open, said wide open throttle benefits being provided by said intake mixture preparation system over at least half of a range of operating speed of said engine output shaft required to satisfy all operating conditions of the load, a discrete-ratio gearbox which receives power from the engine power output shaft and which has a gearbox power output shaft that provides substantially all mechanical energy for powering the load, substantially all of said mechanical energy for powering the load being transferred from the engine to the load without a significant time delay, and means operative to select a gear ratio according to a mapping of gear ratios available in said gearbox onto an area of rotational speed of said gearbox power output shaft versus position of an operator input means in response to which position the engine throttle valve device is adjusted, said mapping utilizing substantially maximized density of the engine combustion air, including positions of the engine throttle valve device which substantially minimize throttling of the engine combustion air, to establish engine power levels which extend upward from below one-half of the engine's maximum power level, said mapping having an acceptable amount of shift schedule hysteresis and at the same time allowing elimination of substantially all unacceptable gaps in power available for driving the load, whereby performance of the engine approaching that available using a highly efficient continuously variable transmission is available using said discrete-ratio gearbox in place of said CVT.

10. The apparatus of claim 9 wherein (1) the engine is a naturally-aspirated engine of a type which, in order to prevent misfire, requires intake air throttling over at least a major range of brake torque output produced at said engine power output shaft, (2) said operator input means comprises an accelerator pedal and (3) the apparatus further comprises (a) means for eliminating said intake charge dilution only when said accelerator pedal is fully depressed and (b) means which establishes a first range of position of the engine throttle valve device for operation of the engine using a first of said available gearbox ratios and a second range of said throttle valve position for operation of the engine using a second of said available gearbox ratios, said first and said second ranges of throttle valve position strongly overlapping each other when said gearbox output shaft speed holds a constant value, but said accelerator pedal establishing said first range of throttle valve position at said constant gearbox output speed only when said pedal is advanced to a range of its position beyond that which establishes said second range of throttle valve position at said constant gearbox output speed, said strong overlapping of throttle position ranges without corresponding overlapping of pedal position ranges existing throughout a broad range of operating speed of said gearbox output shaft within which said first and said second ranges of throttle valve position are each changing and are each continuously bounded by operation of the engine with substantially maximized density of the engine combustion air, whereby full engine power is available without compromising fuel economy achieved when said accelerator pedal is less than fully depressed and whereby said overlapping of throttle position ranges automatically reduces gaps in power caused by gearshifting between said first and said second gear ratios.

11. The apparatus of claim 9 wherein (1) said operator input means is operative to command a varying desired level for power substantially as delivered from said gearbox output shaft to drive the load, said commanded level of power having a discrete current value and (2) the apparatus further comprises drive-by-wire means operative to adjust control devices comprising the engine throttle valve device to thereby substantially equalize current magnitude of said gearbox output shaft power to said current value of commanded power, said drive-by-wire means being operative to adjust said control devices to thereby maintain said power equalization when operating speed of the engine power output shaft changes while said commanded power level remains constant, including changes in engine operating speed that are caused by gearshifts in said gearbox, whereby said drive-by-wire means automatically closes gaps in the availability of said gearbox output shaft power.

12. Apparatus for improving the fuel economy of a naturally-aspirated Otto cycle engine which delivers power to a load through a discrete-ratio transmission, the engine being of a type which, in order to prevent misfire, requires intake air throttling over at least a major range of break torque produced by the engine and the apparatus comprising:

operator input means operative to command a varying level for power substantially as delivered from a power output shaft of the transmission to the load, said commanded power level having a discrete current value, and drive-by-wire means operative to use a variable rate of air-fuel charge dilution in securing substantial equalization of (1) of said commanded power level and (2) current magnitude of said power as delivered from said transmission power output shaft to the load, said drive-by-wire means using said variable air-fuel dilution rate to contribute at least significantly to maintaining said power equalization when operating speed of the engine changes due to gearshifts occurring in the transmission.

whereby air-fuel charge dilution contributes both to fuel economy of the engine and to automatic closing of power gaps caused by said gearshifts.

13. The apparatus of claim 12 wherein said drive-by-wire means employs adjustment of a throttle valve of the engine in conjunction with said variable air-fuel dilution rate to thereby maintain said automatic closing of power gaps arising from gearshifts, whereby said air-fuel dilution can be more nearly optimized with respect to high fuel economy and low exhaust emissions of the engine.

14. The apparatus of claim 13 further comprising means operative to select a gear ratio according to a mapping of gear ratios available in the transmission onto an area of rotational speed of said transmission output shaft versus said commanded power level, said mapping requiring substantially maximized density of combustion air consumed by the engine to establish engine power levels extending upward from below one-half of the engine's maximum power level obtained with zero air-fuel charge dilution, said mapping having at most a an acceptable amount of shift schedule hysteresis and time allowing elimination of substantially all significant gaps in power available to drive the load, whereby said accelerator pedal commands control of both torque and operating speed of the engine, but without allowing unacceptable gaps in said power available to drive the load and without sacrificing engine fuel economy.

15. Apparatus for improving the overall efficiency with which mechanical power is both produced by an Otto cycle engine and delivered to a load, the engine consuming only an intake charge comprising air and fuel in stoichiometric proportion thereto to thereby produce the mechanical power, the engine having at least one combustion chamber and said fuel and said air at least beginning to merge before entering each of said at least one combustion chamber, a power output shaft of the engine providing the mechanical power for delivery to the load and having an overall range of rotational speed consisting of all values of rotational speed with which said output shaft provides the mechanical power for delivery to the load, the apparatus comprising:

a designated induction-and-fuel-metering system for the engine selected from a naturally-aspirated induction-and-fuel-metering system and a supercharged induction-and-fuel-metering system, said naturally-aspirated induction-and-fuel-metering system comprising a throttle valve device and a first intake mixture preparation means, said throttle valve device being interposed in a flow comprising substantially all of said engine intake air to thereby provide control of the mechanical power for delivery to the load, said throttle valve device having an actually wide open position which minimizes density reduction of said intake air caused by thermodynamic free expansion in said flow of intake air as said intake air passes through said throttle valve device, said minimization of density reduction occurring when said engine output shaft speed is maximized in said overall speed range of said engine output shaft, said throttle valve device being effectively wide open whenever said flow of engine intake air is substantially free of density reduction of said intake air caused by thermodynamic free expansion in said flow of intake air as said intake air passes through said throttle valve device, and said throttle valve device also being effectively wide open whenever said throttle valve device is substantially in said actually wide open position, said first intake mixture preparation means having an efficient wide-open-throttle calibration for automatically providing full dilution of the intake charge when said throttle valve device is effectively wide open, said wide-open-throttle calibration extending substantially throughout an efficient rotational speed range of said engine output shaft which is at least 50% as wide as said overall engine range when each of said efficient and said overall engine speed ranges is expressed as a positive range of revolutions per minute, the intake charge consisting of said full intake charge dilution and said stoichiometric portion of the intake charge at substantially all times when said first intake mixture preparation means is implementing said wide-openthrottle calibration, with said engine output shaft operating at each particular speed value within said efficient engine speed range said full intake charge dilution both having a particular composition and being in a weight proportion to said stoichiometric portion which substantially minimizes brake specific cost measured at said engine output shaft with (a) said engine output shaft operating at said particular speed value, (b) said throttle valve device being effectively wide open, (c) ambient air density being representative of anticipated operating conditions for the engine and (d) the intake charge consisting of said stoichiometric portion and dilution of said particular composition, said brake specific cost comprising mass amount of said fuel consumed by the engine to produce one brake-horsepower-hour of mechanical energy, and said supercharged induction-and-fuel-metering system comprising said throttle valve device, a supercharger for the engine and a second intake mixture preparation means, said second intake mixture preparation means having an efficient full-boost-pressure calibration for automatically providing full-boost dilution of the intake charge when said supercharger is providing full boost pressure to the engine, said full-boost-pressure calibration extending substantially throughout said efficient engine speed range and the intake charge consisting of said full-boost intake charge dilution and said stoichiometric portion of the intake charge at substantially all times when said second intake mixture preparation means is implementing said full-boost-pressure calibration, with said engine output shaft operating at each constant speed value within said efficient engine speed range said full-boost dilution of the intake charge having a specific composition and being in at least that weight proportion to said stoichiometric portion which substantially minimizes said brake specific cost measured at said engine output shaft with (a) said engine output shaft operating at said constant speed value, (b) said supercharger providing full boost pressure to the engine, (c) ambient air density being representative of anticipated operating conditions for the engine and (d) the intake charge consisting of said stoichiometric portion and dilution of said specific composition, the engine having torque control means which comprises said throttle valve device and which is used to provide substantially all regulation of brake torque produced by the engine output shaft at each fixed value of said engine output shaft speed throughout said efficient engine speed range, said designated induction-and-fuel-metering system being calibrated to automatically regulate mass consumption rate of said fuel by the engine to a magnitude which depends upon both said engine output shaft speed and status of said torque control means, said automatic regulation of fuel consumption comprising said wide-open-throttle calibration if the apparatus includes said naturally-aspirated induction-and-fuel-metering system and said automatic regulation of fuel consumption comprising said full-boost-pressure calibration if the apparatus includes said supercharged induction-and-fuel-metering system, discrete-ratio means which couples said engine output shaft to a power input element of the load through a number of discrete rotational speed ratios at least equal to two, each of said number of discrete speed ratios being expressed as a dimensionless ratio of rotational speed of an element of said discrete-ratio means driven by said engine output shaft to concurrent rotational speed of said input element of the load obtained with zero power loss due to slippage between said engine driven element and said load input element, a power unit comprising the engine and said discrete-ratio means having at least two operating modes with which the mechanical power is produced by the engine and delivered to said input element of the load, each one of said at least two operating modes having, in conjunction with said automatic regulation of engine fuel consumption provided by said designated induction-and-fuel-metering system, associated therewith a different topographical mode performance mapping of a surface of said brake specific cost substantially as measured at said input element of the load onto an area of said rotational speed of said input element of the load versus magnitude of the mechanical power substantially as measured at said input element of the load, said brake specific cost consisting of a sum of products which includes said mass amount of fuel consumed per brake-horsepower-hour, each of said products being a brake specific performance parameter multiplied by a weighting factor having a relative value chosen to optimize operation of said power unit, and means operative to select one of said at least two power unit operating modes according to a mapping of said at least two operating modes onto an area of said rotational speed of said input element of the load versus position of an operator input means in response to which position said torque control means is adjusted, said mapping utilizing substantially maximized density of said engine intake air to establish engine power levels extending upward from below one-half of the engine's maximum power level, whereby performance of the engine approaching the best obtainable using a continuously variable transmission is available using said discrete-ratio means in place of said CVT.

16. The apparatus of claim 15 wherein said means operative to select one of said at least two power unit operating modes does so according to a second gearshift mapping of said at least two operating modes, said second gearshift mapping being onto said area of said topographical performance mappings of said at least two operating modes, each individual point on said second gearshift mapping (1) having associated therewith particular value of said rotational speed of said load input element and of said magnitude of power as measured at said load input element, more than one of said at least two operating modes being available to establish said particular values of speed and power and (2) being associated by said second gearshift mapping with a particular one of said at least two operating modes which has a candidate value of said brake specific cost at least as low as that of any other of said more then one modes available to establish said individual point on said second gearshift mapping, each one of said more than one available modes having its candidate value of brake specific cost obtained from (1) a specific one of said topographical performance mappings which applies to said one of said more than one available operating modes and (2) a location on said specific performance mapping determined by said particular values of speed and power, wherein said power unit operates according to said second gearshifting mapping to thereby reduce said brake specific cost as measured at said load input element.

17. The apparatus of claim 15 further comprising means which establishes a first range of status of said engine torque control means for operation of said power unit using a first of said number of discrete speed ratios and a second range of said status of said engine torque control means for operation of said power unit using a second of said number of discrete speed ratios, said first and said second ranges of said torque control status strongly overlapping each other when said rotational speed of said load input element holds a constant value, but said operator input means establishing said first range of said torque control status at said constant load input speed only when said operator input means is advanced to a range of its status beyond that which establishes said second range of said torque control status at said constant load input speed, said strong overlapping of torque control ranges without corresponding overlapping of ranges of said status of said operator input means existing throughout a broad range of said rotational speed of said load input element within which broad load input speed range said first and said second ranges of torque control status are each changing, whereby said overlapping of torque control ranges automatically reduces gaps in power caused by gearshifting between said first and said second speed ratios.

18. The apparatus of claim 16 wherein (1) the engine is a naturally-aspirated engine, (2) said operator input means comprises an accelerator pedal and (3) the apparatus further comprises (a) means for eliminating said full intake charge dilution when said accelerator pedal is fully depressed and (b) means which establishes a first range of position of said engine throttle valve device for operation of said power unit using a first of said number of discrete speed ratios and a second range of position of said engine throttle valve device for operation of said power unit using a second of said number of discrete speed ratios, said first and said second ranges of throttle valve position strongly overlapping each other when said rotational speed of said load input element holds a constant value, but said accelerator pedal establishing said first range of throttle valve position at said constant load input speed only when said accelerator pedal is advanced to a range of its position beyond that which establishes said second range of throttle valve position, said strong overlapping of throttle position ranges without corresponding overlapping of accelerator pedal position ranges existing throughout a broad range of said rotational speed of said load input element within which broad load input speed range said first and said second ranges of throttle valve position are each changing, whereby full engine power is available without compromising fuel economy depressed and whereby said accelerator pedal is less than fully depressed and whereby said overlapping of throttle position ranges automatically reduces gaps in power caused by gearshifting between said first and said second speed ratios.

19. The apparatus of claim 16 wherein (1) said operator input means is operative to command a varying desired level for said power substantially as measured at said input element of the load, said commanded level of power having a discrete current value, (2) said means which selects an operating mode for said power unit uses said current value of commanded power in making said selection of operating mode according to said second gearshift mapping and (3) the apparatus further comprises drive-by-wire means operative to adjust said engine torque control means to thereby substantially equalize current magnitude of said power measured at said load input element to said current value of commanded power, said drive-by-wire means being operative to adjust said engine torque control means to thereby maintain said power equalization when operating speed of said engine output shaft changes while said commanded power level remains constant, including changes in said engine operating speed that are caused by gearshifts occurring in said discrete-ratio means, whereby said drive-by-wire means automatically closes gaps in the availability of said power measured at said load input element.

20. The apparatus of claim 1 further comprising means operative to select a gear ratio according to a gearshift mapping of gear ratios available in said gearbox onto an area of power substantially as measured at said gearbox output shaft versus rotational speed of said gearbox output shaft, a power unit comprising the engine and the gearbox having at least two operating modes with which power is produced by the engine and made available at said gearbox output shaft, each one of said at least two operating modes (1) including a gear ratio selected from said gear ratios available in the gearbox and (2) having, in conjunction with said wide open throttle charge dilution associated therewith a different topographical mode performance mapping of a surface of brake specific cost substantially as measured at said gearbox output shaft onto said area of gearbox output power and speed, said brake specific cost comprising mass amount of fuel consumed by the engine to produce one brake-horsepower-hour of mechanical energy, each individual point on said gearshift mapping (1) having associated therewith particular values of said power measured at said gearbox output shaft and of said gearbox output shaft speed, more than one of said at least two operating modes being available to establish said particular values of power and speed and (2) being associated by said gearshift mapping with a particular one of said at least two operating modes which has a candidate value of said brake specific cost at least as low as that of any other of said more than one modes available for said individual point on said gearshift mapping, each one of said more than one available modes having its candidate value of brake specific cost obtained from (1) a specific one of said topographical performance mappings which applies to said one of said more than one available operating modes and (2) a location on said specific performance mapping determined by said particular values of power and speed, whereby said power unit operates according to said gearshift mapping to thereby reduce said brake specific cost as measured at said gearbox output shaft.

21. The apparatus of claim 18 wherein the engine is an Otto cycle engine having a throttle valve device used in providing said regulation of engine brake torque and wherein the apparatus further comprises an intake mixture preparation system for the engine which establishes said fuel consumption schedule and in establishing part of said fuel consumption schedule is operative to use intake charge dilution to automatically provide benefits of (1) reducing brake specific fuel consumption of the engine and (2) suppressing autoignition in the engine when density of combustion air consumed by the engine is substantially maximized with said throttle valve device being at least sufficiently wide open, said wide open throttle benefits being provided by said intake mixture preparation system over at least half of a range of said engine operating speed required to satisfy all operating conditions of the load, whereby the Otto engine is more fuel efficient than a conventionally-calibrated Otto engine.

22. The apparatus of claim 9 wherein said means operative to select a gear ratio according to said first-mentioned mapping also does so according to a second mapping, said second mapping being onto an area of power substantially as measured at said gearbox power output shaft versus said gearbox output shaft speed, a power unit comprising the engine and the gearbox having at least two operating modes with which power is produced by the engine and made available at said gearbox output shaft, each one of said at least two operating modes (1) including a gear ratio selected from said ratios available in the gearbox and (2) having, in conjunction with said intake charge dilution, associated therewith a different topographical mode performance mapping of a surface of brake specific cost substantially as measured at said gearbox output shaft onto said area of said second mapping, said brake specific cost comprising mass amount of fuel consumed by the engine to produce one brake-horsepower-hour of mechanical energy, each individual point on said second mapping (1) having associated therewith particular values of said power measured at said gearbox output shaft and of said gearbox output shaft speed, more than one of said at least two operating modes being available to establish said particular values of power and speed and (2) being associated by said second mapping with a particular one of said at least two operating modes which has a candidate value of said brake specific cost at least as low as that of any other of said more than one modes available for said individual point on said second mapping, each one of said more than one available modes having its candidate value of brake specific cost obtained from (1) a specific one of said topographical performance mappings which applies to said one of said more than one available operating modes and (2) a location on said specific performance mapping determined by said particular values of power and speed, whereby said power unit often operates according to said second mapping to thereby reduce said brake specific cost as measured at said gearbox output shaft.

23. The apparatus of claim 18 wherein the engine is a naturally-aspirated Otto cycle engine having a throttle valve device used to provide substantially all control of combustion air density for the engine, the engine being of a type which, in order to prevent misfire, requires intake air throttling over at least a major range of said engine brake torque and wherein said means for regulating mass consumption rate of fuel by the engine comprises an intake mixture preparation system of the engine which establishes said fuel consumption schedule and in establishing part of said fuel consumption schedule is operative when said throttle valve device is at least effectively wide open to automatically use intake charge dilution to provide benefits of (1) reducing brake specific fuel consumption of the engine and (2) suppressing autoignition in the engine, said wide open throttle benefits being provided by said intake mixture preparation system over at least half of a range of said engine operating speed required to satisfy all operating conditions of the load, whereby the Otto engine is more fuel efficient than a conventionally-calibrated Otto engine.

24. Apparatus for improving efficiency with which mechanical power is produced by a combustion engine and delivered to a load, the engine having torque control means which (1) comprises at least one engine control device and (2) is used to provide substantially all regulation of brake torque produced at a power output shaft of the engine, and the engine having means operative to automatically regulate mass consumption rate of fuel by the engine according to a schedule which depends on both of operating speed of said engine power output shaft and status of said engine torque control means, a first shift map of a selection of discrete gear ratio values on an area defined by an operating speed of the load and by said status of said engine torque control means (1) being derived from a second shift map of said selection of gear ratio values and (2) having unacceptable overlapping of different ones of said selection of gear ration values when said first shift map closes all unacceptable gaps in power available from the engine to drive the load, said overlapping of different gear ratio values on said first shift map being unacceptable in that upshifts performed according to said first shift map are unacceptably delayed when the load is accelerating while said status of said engine torque control means remains fixed, the apparatus comprising:

a discrete-ratio gearbox which makes each of said selection of gear ratio values available for coupling said engine power output shaft to drive the load through a power output shaft of the gearbox, said operating speed of the load being identical to operating speed of said gearbox output shaft, gear ratio selection means operative to select and enable an optimum one of said selection of gear ratio values according to said second shift map of said section of gear ratio values, said second shift map being on an area defined by said operating speed of the load and by magnitude of the mechanical power substantially as delivered to the load, each one of said selection of gear ratio values having in conjunction with performance of the engine as established by said fuel consumption schedule a topographical map of brake specific cost of engine operation on said area of said second shift map, said brake specific cost of engine operation on said area of said second shift map, said brake specific cost of engine operation comprising mass amount of fuel consumed by the engine in delivering one brake-horsepower-hour of mechanical energy to the load and each individual point on said second shift map (1) having associated therewith particular values of said operating speed of the load and of said magnitude of the power as delivered to the load and (2) being associated by said second shift map with one of said selection of gear ratios values which has a candidate value of said brake specific cost of engine operation at least as low as that of any other of said selection of gear ratio values which is capable of allowing the engine to establish said particular values of load speed and power, each example of said selection of gear ratio values which are capable of allowing the engine to establish said particular values of load speed and power having its candidate value of said brake specific cost of engine operation obtained from (1) a specific one of said topographical maps of brake specific cost which applies to said example gear ratio value and (2) a location on said specific topographical map determined by said particular values of load speed and power, said second shift map thereby closing all of said unacceptable gaps in power without having said unacceptable gear ratio overlapping which occurs on said first shift map, said first shift map being derived from said second shift map by employing performance data for operating the engine and said gearbox using said fuel consumption schedule and an applicable one of said selection of gear ratio values, said performance data being used to convert each individual power magnitude on said second shift map to a value on said first shift map of status of said engine torque control means, input means operative to command a desired level for said magnitude of power as delivered to the load, said selection of an optimum gear ratio value by said gear ratio selection means being accomplished using said desired level of power as a value for said magnitude of power as delivered to the load, and drive-by-wire means operative to establish (a) a first range of said status of said engine torque control means for operation of the engine when a first of said selection of gear ratio values is enables in said gear box and (b) a second range of said status of said engine torque control means for operation of the engine when a second of said gear ratio values is enable in said gearbox, said first and said second ranges of torque control status strongly overlapping each other when said operating speed of the load holds a constant value, but said drive-by-wire means establishing said first range of torque control status at said constant load speed only when said input means is advanced to command a range of said desired level of power beyond that which causes said drive-by-wire means to establish said second range of torque control status at said constant load speed, said strong overlapping of said range of torque control status without corresponding overlapping in status of said input means existing throughout a broad range of said operating speed of the load within which broad speed range said first and said second ranges of torque control status are each changing, whereby said discrete-ratio gearbox facilitates performance of the engine approaching that available with a continuously variable transmission having a ratio range equal to that of said selection of gear ratio values, but said engine performance is achieved with neither unnecessary gaps in availability of power to drive the load nor excessive shift schedule hysteresis.

25. The apparatus of claim 24 wherein said brake specific cost of engine operation comprises mass amount of fuel consumed by the engine in delivering one brake-horsepower-hour of mechanical energy to the load added to at least one product of an exhaust emission weighting factor and total mass amount of a chemical species emitted in exhaust gas of the engine while the engine operates to deliver said one brake-horsepower-hour of mechanical energy to the load, at least one of said at least one weighting factor being chosen to achieve a desirable tradeoff of fuel efficiency of the engine for reduced exhaust emissions from the engine, whereby overall performance of the engine is improved in spite of some loss in fuel efficiency of the engine.

26. The apparatus of claim 25 wherein said drive-by-wire means is operative to adjust said status of said engine torque control means to thereby substantially equalize said magnitude of the power as delivered to the load and said desired level of power, said drive-by-wire means being operative to adjust said status of said engine torque control means to maintain said power equalization when operating speed of said engine power output shaft changes while said desired level of power remains constant, including when said engine operating speed changes due to gearshifts in said gearbox, wherein said drive-by-wire means automatically closes gaps in availability of power to drive the load of all mechanical energy produced by the engine for powering the load, whereby the Otto engine is more fuel efficient than a conventionally-calibrated Otto engine.

27. The apparatus of claim 24 wherein the engine is an Otto cycle engine having a throttle valve device used in providing said regulation of engine brake torque and wherein the apparatus further comprises an intake mixture preparation system for the engine which establishes said fuel consumption schedule by automatically using intake charge dilution to secure a reduction in brake specific fuel consumption of the engine when density of combustion air consumed by the engine is substantially maximized with said throttle valve device being at least effectively wide open, said reduction in engine BSFC being obtained by using said intake charge dilution to improve the balance between mechanical and thermal losses occurring in the engine and said intake charge dilution displacing an average of at least 10% by weight of air-fuel charge consumed by the engine when displacement of air-fuel charge is determined by mathematically integrating percentage displacement of said air-fuel charge with respect to operating speed of said engine power output shaft, said integration being over at least half of a range of said engine operating speed required to satisfy all operating conditions of the load, whereby the Otto engine is more fuel efficient than a conventionally-calibrated Otto engine.

28. The apparatus of claim 27 wherein said drive-by-wire means is operative to adjust said status of said engine torque control means to thereby substantially equalize said magnitude of the power as delivered to the load and said desired level of power, said drive-by-wire means being operative to adjust said status of said engine torque control means to maintain said power equalization when operating speed of said engine power output shaft changes while said desired level of power remains constant, including when said engine operating speed changes due to gearshifts in said gearbox, whereby said drive-by-wire means automatically closes gaps in availability of power to drive the load.

29. The apparatus of claim 24 wherein the engine is a naturally-aspirated Otto cycle engine having a throttle valve device used to provide substantially all control of combustion air density for the engine, the engine being of a type which, in order to prevent misfire, requires intake throttling over at least a major range of said engine brake torque, and said means for regulating mass consumption rate of fuel by the engine comprising an intake mixture preparation system of the engine which establishes said fuel consumption schedule by using intake charge dilution to secure a reduction in brake specific fuel consumption of the engine when said throttle valve device is at least effectively wide open, said wide open throttle charge dilution displacing an average of at least 10% by weight of air-fuel charge consumed by the engine and said at least 10% average displacement being determined by mathematically integrating percentage displacement of said air-fuel charge with respect to operating speed of said engine power output shaft, said integration being over at least half of a range of said engine operating speed required to satisfy all operating conditions of the load, whereby the Otto engine is more fully efficient than a conventionally-calibrated Otto engine.

* * * * *